United States Patent
Kvavle et al.

(10) Patent No.: US 8,355,892 B2
(45) Date of Patent: Jan. 15, 2013

(54) REMOTE DIAGNOSTICS FOR ELECTRONIC WHITEBOARD

(75) Inventors: Brand C. Kvavle, Tigard, OR (US);
James D. Watson, Duluth, GA (US);
Neal A. Hofmann, Portland, OR (US);
David W. Behner, Portland, OR (US);
Louis A. Ashford, Aloha, OR (US)

(73) Assignee: Steelcase Inc., Grand Rapids, MI (US)

( * ) Notice: Subject to any disclaimer, the term of this patent is extended or adjusted under 35 U.S.C. 154(b) by 260 days.

(21) Appl. No.: 12/303,299

(22) PCT Filed: Jun. 6, 2007

(86) PCT No.: PCT/US2007/013300
§ 371 (c)(1),
(2), (4) Date: Jun. 19, 2009

(87) PCT Pub. No.: WO2007/145986
PCT Pub. Date: Dec. 21, 2007

(65) Prior Publication Data
US 2010/0030505 A1     Feb. 4, 2010

Related U.S. Application Data

(60) Provisional application No. 60/811,346, filed on Jun. 6, 2006.

(51) Int. Cl.
*G06F 11/30* (2006.01)
*G06F 3/041* (2006.01)
(52) U.S. Cl. ........................................ 702/185; 345/173
(58) Field of Classification Search .................. 702/185, 702/34–36, 57–59, 81, 84–85, 94–95, 107–108, 702/116–117, 127, 139, 150, 182–183, 188–189; 345/158, 173, 175, 177–179; 356/237.1–237.5; 715/764
See application file for complete search history.

(56) References Cited

U.S. PATENT DOCUMENTS 5,274,362 A * 12/1993 Potvin ........................... 345/178
5,790,114 A *  8/1998 Geaghan et al. ............... 715/763
(Continued)

FOREIGN PATENT DOCUMENTS

WO          98/14888 A1    4/1998

OTHER PUBLICATIONS

Supplemental European Search Report; EP 07795795; 10 pages.

(Continued)

*Primary Examiner* — Toan M Le
(74) *Attorney, Agent, or Firm* — Quarles & Brady LLP

(57) ABSTRACT

A method and apparatus for diagnosing causes of a malfunction of an electronic whiteboard that includes a white-board surface, the method comprising the steps of linking a remote computer that includes a remote display to the electronic whiteboard from a remote location, interacting with the whiteboard surface to generate X and Y coordinates associated with surface activity, transmitting at least one of the X and Y coordinates associated with the surface activity to the remote computer, displaying at least a subset of the at least one of X and Y coordinates via the remote display and examining the at least a subset of the at least one of X and Y coordinates via the remote display to ascertain the cause of a board malfunction.

27 Claims, 24 Drawing Sheets

U.S. PATENT DOCUMENTS

| | | | |
|---|---|---|---|
| 6,501,463 B1 * | 12/2002 | Dahley et al. | 345/173 |
| 6,587,099 B2 * | 7/2003 | Takekawa | 345/175 |
| 6,724,373 B1 * | 4/2004 | O'Neill et al. | 345/179 |
| 7,236,161 B2 | 6/2007 | Geaghan et al. | |
| 2001/0032057 A1 | 10/2001 | Smith et al. | |
| 2004/0183787 A1 | 9/2004 | Geaghan et al. | |
| 2006/0284644 A1 * | 12/2006 | Owhadi et al. | 324/770 |
| 2007/0216660 A1 | 9/2007 | Sposato et al. | |

OTHER PUBLICATIONS

PCT International Search Report, PCT/US2007/013300, Aug. 13, 2008.

PCT International Preliminary Report on Patentability, PCT/US2007/013300, Dec. 10, 2008.

European Patent Office, Extended European Search Report, EP 10005149.9, Nov. 24, 2010.

* cited by examiner

| DATA VIEW | | |
|---|---|---|
| COUNT | TIMESTAMP | DATA |
| 524 | 32104... | 0xc0, 0x72, 0x3b, 0x70, 0x1e, 7666, 3952 |
| 525 | 32105... | 0xc0, 0x4a, 0x3b, 0x26, 0x1e, 7626, 3878 |
| 526 | 32105... | 0xc0, 0x20, 0x3b, 0x56, 0x1d, 7584, 3798 |
| 527 | 32106... | 0xc0, 0x78, 0x3a, 0x0, 0x1d, 7544, 3712 |
| 528 | 32106... | 0xc0, 0x52, 0x3a, 0x24, 0x1c, 7506, 3620 |
| 529 | 32107... | 0xc0, 0x30, 0x3a, 0x44, 0x1b, 7472, 3524 |
| 530 | 32107... | 0xc0, 0x10, 0x3a, 0x60, 0x1a, 7440, 3424 |
| 531 | 32108... | 0xc0, 0x62, 0x39, 0x2a, 0x19, 7394, 3242 |
| 532 | 32108... | 0x80, 0x56, 0x39, 0x76, 0x18, 7382, 3190 |

☑ SHOW BOARD  ☐ PUT BOARD IN RAW MODE
☐ SHOW UNFILTERED DATA  ☐ CROP  10 ▾
☐ SHOW COMDS SENT TO BRD

SAVE
CLEAR

FIG. 9

REMOTE DIAGNOSTICS FOR ELECTRONIC WHITEBOARD

CROSS-REFERENCE TO RELATED APPLICATIONS

This application claims the benefit of International Application No. PCT/US2007/013300, filed on Jun, 6, 2007; which claims benefit to of U.S. Provisional Patent Application No. 60/811,346 filed on Jun. 6, 2006.

STATEMENT REGARDING FEDERALLY SPONSORED RESEARCH OR DEVELOPMENT

Not applicable.

BACKGROUND OF THE INVENTION

The present invention relates to electronic whiteboards and more specifically to remote diagnostic systems for electronic whiteboards.

Various types of electronic whiteboards have been developed to help people share information. To this end, most electronic whiteboards include a large flat surface on which information is applied for viewing by people within a conference or other type of space, some type of a sensor system for sensing interactive activities with the whiteboard surface that are intended to alter the information presented on the surface, some type of whiteboard driver for controlling the information that is present on the whiteboard surface and a computer (e.g., a laptop, PC, etc.) to run whiteboard and other software applications.

In some cases a whiteboard system will include a large liquid crystal display (LCD) or a plasma display for presenting information and the driver will be a display driver. Here, the sensor systems typically include a laser type system that senses the locations of pen tips, the location of a finger tip, etc., adjacent the front surface of the display to determine when image altering activities are occurring. In other cases the whiteboard system will include a projector that projects images on the whiteboard surface and the whiteboard surface may be touch sensitive. Exemplary touch sensitive whiteboards may include first and second layers that form the whiteboard surface where pressing of a pen tip against the first layer causes the rear surface thereof to contact the front surface of the second layer and where the contact location between the first and second layers can be sensed. In still other cases the whiteboard may be equipped with ultrasonic sensors and a writing device (e.g., a pen) to be used therewith may generate a clicking noise that is sensed by the sensors and that can be used in a triangulation process to identify pen tip location. In any of the above cases, as a change is made to alter a whiteboard image (e.g., a pen tip is moved diagonally across the whiteboard surface), the activity is sensed and used to alter the surface image.

In the case of a system that includes a touch sensitive whiteboard surface and a projected image, a precise calibration of the projected image to the whiteboard surface is required for the system to reproduce image changes that accurately reflect image altering activities performed by a person using the whiteboard. One solution for aligning a projected image with a whiteboard sensing system is to facilitate a calibration commissioning procedure wherein a known image is projected onto the whiteboard that includes reference points. A system user contacts each of the reference points with a stylus or the like to earmark the locations. Thereafter the system computer stores the locations of the reference points and uses those points to calibrate other locations on the whiteboard surface. While this solution works well when performed properly, when this solution is not performed properly or is performed in a sloppy fashion (e.g., the points selected by the user are not precisely aligned with the projected reference points), alignment is inaccurate and activities on the whiteboard surface intended to alter whiteboard images are imprecisely replicated by the whiteboard.

After a whiteboard has been calibrated or has been calibrated and the projection from a projector is aligned with the whiteboard surface during a commissioning procedure, during operation of the whiteboard, the whiteboard can malfunction in several different ways. For instance, several different occurrences can degrade or substantially hinder pen/stylus tip tracking including lose or corruption of calibration data (e.g., due tot a power surge), sensor malfunctions, a short in between layered whiteboard sensors (e.g., due to debris lodged between layers), whiteboard power fluctuations, etc.

As another instance, several different whiteboard components can malfunction independent of other whiteboard components. For example, whiteboard LEDs that indicate specific activities can burn out or otherwise be rendered unable to be illuminated. As another example, a whiteboard cooling fan can malfunction. Other exemplary components that can malfunction include sound generators (e.g., speakers), a whiteboard processor, etc.

As still one other instance, a whiteboard can malfunction when the laptop or PC used to control the whiteboard has application programs loaded thereon that are incompatible with the whiteboard application programs. Thus, for instance, where a laptop has thirty different applications programs loaded in addition to the whiteboard application program, it may be that two of the application programs in addition to the whiteboard application program are not compatible with the whiteboard program so that the whiteboard program malfunctions in some respects during whiteboard activities.

In many cases symptoms of whiteboard malfunction may result from any of several different causes and in these cases it is often difficult to determine what a symptom is indicating. For instance, where a whiteboard does not accurately track the tip of a stylus, is the inaccurate tracking symptom caused by loss or degradation of calibration data, a malfunctioning sensor, a malfunctioning board processor, a power malfunction, etc. As another instance, where an LED does not illuminate when anticipated, is the dark LED an indication that the LED is not working, that a sensor linked to the LED has malfunctioned or that the operating characteristic associated with the dark LED has not occurred. As still one other instance, when a fan does not rotate when expected, is the still fan an indication that the fan is not working, that a temperature sensor that controls the fan is not working or that the whiteboard temperature is simply to low for the fan to rotate.

Typically when a whiteboard malfunctions, a technician is dispatched to the location of the board on a service call. Once the technician arrives at the board location, the technician observes the malfunction symptoms and assesses likely causes of the malfunction. Next the technician performs various tests to determine the cause(s) of the malfunction and then the technician repairs or reprograms (e.g., performs a recalibration process to regenerate calibration data for the board) the board to eliminate the malfunction.

While dispatching a technician works well to correct malfunctions, this solution has several shortcomings. First, technicians are often highly trained people and therefore their time is very expensive. Dedicated technician trips to board locations are expensive and therefore should be avoided whenever possible.

Second, qualified technicians are not always immediately available for dispatch to malfunctioning boards and therefore there is often a delay between the time a request for technical support is lodged and the time at which a technician arrives at a board location to diagnose the cause of a malfunction. This board down time is, at a minimum, a nuisance and in many cases can affects productivity of people that use the board.

Third, in some cases malfunctions are relatively minor and do not affect the overall operation of a whiteboard for its primary purpose. For instance, where an LED malfunctions, other whiteboard components may still operate effectively so that the board can be used for its primary and intended purpose despite the dark LED. If a board user could ascertain that the LED has burnt out and that the dark LED is not indicating some more serious system problem, the user may forego repair/replacement of the LED to avoid the technician cost or may simply put off LED replacement until a more urgent maintenance issue occurs thereby reducing (i.e., one dispatch instead of two) and delaying costs. In the alternative, a board user may be able to easily repair a malfunctioning component (e.g., a burnt out LED) thereby eliminating the need for technician dispatch altogether.

In the computer industry remote diagnostics systems have been developed that allow an IT technician to patch into a local PC or laptop computer to observe a user's desk top activities. Here, in at least some cases, the IT technician is provided a copy of the local computer's desktop in a window and, in addition to being able to observe the desktop image, can run desktop applications in the same way that the local computer can be used to run the applications. In these cases, when the remote computer runs the applications on the local computer, the remote image mirrors the local image. While this solution works well in the case of PCs and laptops where software programs are to be examined for faulty operation, this solution does not work well in the case of a whiteboard where, when the board malfunctions, mirroring of the board image alone would be no more instructive as to the cause of the malfunction than if the technician were at the board location observing the board itself. Thus, for instance, where the board fails to accurately track pen tip movement there across, mirroring of the board image would simply generate an image from which the tracking inaccuracy alone could not be identified. As another instance, where an LED remains dark when it should have been illuminated, known remote diagnostic systems could not be used to ascertain or narrow down the cause (e.g., burnt out LED, malfunctioning sensor, etc.) of the dark LED.

BRIEF SUMMARY OF THE INVENTION

It has been recognized that a remote diagnostics system can be provided for electronic whiteboards that allows a remotely located technician to link to a local whiteboard and run various tests and procedures with the help of a local board user to ascertain at least some causes of board malfunctions or to at least rule out some causes of the malfunctions. Here, in at least some inventive cases, the local user provides input to the whiteboard upon the request of the remote technician and the whiteboard provides feedback to the remote technician that is characteristic of the sensed local user input and which can be used to at least narrow down, if not to outright identify, the cause of the malfunction. In other cases the remote technician directly controls whiteboard features and requires feedback from a local user where the feedback is then used to narrow down or outright identify the cause of a malfunction. For instance, in at least some applications a remote technician has the ability to provide power to any board LEDs and can receive feedback from a local user as to whether or not LEDs are illuminated when powered. Here, if a powered LED fails to light up, the technician can surmise that the LED is burnt out and that, absent other symptoms of malfunction, the burnt out LED is the only malfunction. As another instance, where pen/stylus tracking is inaccurate, a remote technician may instruct a local user to hold a stylus tip against a whiteboard surface at one location while the remote technician views data related to the Y-coordinate of the stylus location being generated by the board. Here, where the power delivered to a board fluctuates, the Y sensed Y-coordinate has been found to fluctuate and thus, where the Y coordinate of a point on the board fluctuates, the technician can surmise that the inaccurate tip tracking is associated with a faulty power source.

Where malfunctions are not serious and do not affect the primary board use, the user can opt to continue using the board without repair or during an interim period prior to routine maintenance. Where malfunctions are serious or seriously impair the primary function of the board and need to be addressed prior to useful board operation, a technician can be dispatched quickly.

At least some inventive embodiments include a feature wherein whiteboard calibration data is stored independently of a whiteboard (e.g., remotely). Here, if a remote technician recognizes that the cause of board malfunction may be corruption or loss of calibration data, the remote technician can remotely take steps to download the board calibration data to the board for subsequent use. Thereafter, if the recalibration download does not successfully eliminate the malfunction, the technician can surmise that some other cause exists for the malfunction and can continue to probe using different searches to determine the cause.

Some embodiments also include a feature wherein, as applications and versions of applications and files that are not compatible with whiteboard software are identified, a database of the conflicting applications/files and versions is generated and stored. Thereafter, when a remote technician links remotely to a laptop or PC that runs whiteboard applications for a seemingly malfunctioning whiteboard, the technician can cause a computer used by the technician to access the list of applications loaded onto the PC or laptop used to locally run the whiteboard applications as well as the list of applications that are incompatible with the whiteboard applications, to compare the list of local computer applications to the list of incompatible applications and to indicate the incompatible applications that are loaded onto the local computer. Observing the list of incompatible applications loaded onto the local computer, the remote technician can use that list to determine if the incompatible applications may be causing the whiteboard of the whiteboard applications run by the local computer to malfunction.

Software allows the remote technician to take independent control of at least some whiteboard features and drive them independent of the whiteboard system and to receive feedback from the users at the local end—here remote technician input is used to independently drive whiteboard components.

Software allows remote technician to patch into local board and observe various characteristics of sensor signals when local user provides input on the whiteboard where the various characteristics are indicative of the cause of board symptoms—here input from local user is viewed in a different format from the local user format.

Consistent with the above, at least some inventive methods include a method for diagnosing causes of a malfunction of an electronic whiteboard that includes a whiteboard surface, a position sensor for sensing surface activity and generating at least one of X and Y coordinates associated with the surface activity and a local computer that runs board software to convert the at least one of X and Y coordinates into operational commands, the method comprising the steps of linking a remote computer that includes a remote display to the electronic whiteboard from a remote location, interacting with the whiteboard surface to generate X and Y coordinates associated with surface activity, transmitting at least one of the X and Y coordinates associated with the surface activity to the remote computer, displaying at least a subset of the at least one of X and Y coordinates via the remote display and examining the at least a subset of the at least one of X and Y coordinates via the remote display to ascertain the cause of a board malfunction.

In at least some cases the step of transmitting at least one of X and Y coordinates includes transmitting both X and Y coordinates associated with surface activity. In some cases the step of displaying at least a subset includes displaying the X and Y coordinates in a coordinate list. In some cases the step of interacting with the whiteboard surface includes sliding an input tool along the whiteboard surface so that the generated X and Y coordinates change over time.

In some cases the X and Y coordinates are presented as coordinate pairs and wherein each X-Y coordinate pair is time stamped. In some cases the method further includes the step of presenting the X and Y coordinates in a graphical fashion via the remote display.

Other embodiments include a method for diagnosing causes of an electronic whiteboard malfunction where the whiteboard includes a whiteboard surface, a position sensor for sensing surface activity and generating X and Y coordinates associated with the surface activity and a local computer that runs board software to convert the X and Y coordinates into graphical segments and that electronically stores the graphical segments, the method comprising the steps of linking a remote computer that includes a remote display and that is remotely located to an electronic whiteboard, moving an input device around on the whiteboard surface to generate X and Y coordinates associated with surface activity, converting the X and Y coordinates into graphical segments, storing the graphical segments, transmitting the X and Y coordinates associated with the surface activity to the remote computer, textually displaying the X and Y coordinates via the remote display and examining the displayed X and Y coordinates to ascertain the cause of a board malfunction.

Still other embodiments include an apparatus for diagnosing causes of an electronic whiteboard malfunction wherein the whiteboard includes a whiteboard surface, a position sensor for sensing surface activity and generating at least one of X and Y coordinates associated with the surface activity and a local computer that runs board software to convert the at least one of X and Y coordinates into operational commands, the apparatus comprising a remote computer that includes a display and a processor where the processor is linked to the electronic whiteboard, the processor programmed to: (a) when a user interacts with the whiteboard surface and the sensor generates raw X and Y coordinates associated with surface activity, receive at least one of the X and Y coordinates associated with the surface activity and (b) textually display at least a subset of the at least one of X and Y coordinates via the display.

In some cases the processor receives both X and Y coordinates associated with surface activity. In some cases the processor displays the X and Y coordinates in a coordinate list. In some cases the X and Y coordinates are presented as coordinate pairs and wherein each X-Y coordinate pair is time stamped. In some cases the processor is further programmed to present the X and Y coordinates in a graphical fashion via the remote display.

Some embodiments include a method for diagnosing causes of a malfunction of an electronic whiteboard, the method comprising the steps of linking a remote computer to the electronic whiteboard from a remote location wherein the remote computer is used by a technician, providing control commands via the remote computer intended to control at least certain features of the whiteboard, transmitting the control commands to the whiteboard to control whiteboard operation, locally determining the operating status of the whiteboard; and providing feedback to the technician regarding the whiteboard status.

In some cases the whiteboard includes a whiteboard subset of components wherein each component in the whiteboard subset is activated upon the occurrence of an operating condition associated with the whiteboard, the step of providing control commands including providing an activation command via the remote computer intended to activate at least a first of the whiteboard subset components independent of the operating condition of the whiteboard and wherein the step of locally determining includes locally determining when the first component is activated. In some cases the first component is an illumination device on the whiteboard. In some cases the whiteboard includes a plurality of illumination devices and wherein the process is repeated for each illumination device in the plurality. In some cases the first component is a whiteboard fan for cooling other whiteboard components. In some cases the first component is a sound generating component.

Yet other embodiments include a method for diagnosing causes of a malfunction of an electronic whiteboard that includes a whiteboard surface, a position sensor for sensing surface activity and generating at least one of X and Y coordinates associated with the surface activity and a local computer that runs board software to convert the at least one of X and Y coordinates into operational commands, the method comprising the steps of linking a remote computer that includes a remote display to the electronic whiteboard from a remote location, interacting with the whiteboard surface to generate X and Y coordinates associated with surface activity, transmitting at least one of the X and Y coordinates associated with the surface activity to the remote computer, graphically displaying one of X and Y coordinates via the remote display and examining the one of X and Y coordinates via the remote display to ascertain the cause of a board malfunction.

Some cases include a method for use with an electronic whiteboard that includes a whiteboard memory where the whiteboard needs to be calibrated prior to use, the method comprising the steps of performing a calibration process to generate calibration data, storing the calibration data in the whiteboard memory, providing a computer separate from the whiteboard that includes a computer memory, storing the calibration data in the computer memory, detecting a whiteboard malfunction, linking the computer to the whiteboard and downloading the calibration data from the computer memory to the whiteboard memory.

In some cases the computer is located remotely from the whiteboard when linked thereto to download the calibration data. In some cases the computer is remotely located from the whiteboard. In some cases the computer is a computer that is linked to the whiteboard and that runs whiteboard application programs to drive the whiteboard. In some cases the step of storing the calibration data in the computer memory includes assigning a unique whiteboard identifier to the calibrated whiteboard, correlating the unique whiteboard identifier with the calibration data and storing the calibrated information in the computer memory. In some cases the method further includes the step of, prior to downloading the calibration data, identifying the unique whiteboard identifier associated with the whiteboard to which calibration data is to be downloaded and accessing the computer memory and using the unique whiteboard identifier to identify the calibration data associated with the whiteboard to which calibration data is to be downloaded.

Other embodiments include a method for ascertaining the cause of an electronic whiteboard malfunction wherein a local computer is provided to run application programs including at least one whiteboard application program, the method comprising the steps of providing a database including a conflict list wherein the conflict list includes application programs that are incompatible with the at least one whiteboard application program, accessing the conflict list, comparing the conflict list with the application programs run by the local computer, identifying any application programs run by the local computer that are included on the conflict list as conflicting application programs and presenting the conflicting application programs for review.

In some cases the step of providing a database includes providing a remote database that is remotely located from the whiteboard and wherein the method further includes the step of providing a remote diagnostics computer, the step of accessing the conflict list including using the diagnostics computer to access the conflict list, the step of comparing including linking the diagnostics computer to the local computer, using the diagnostics computer to obtain a local computer list of local computer application programs and using the diagnostics computer to compare the local computer list with the conflict list. In some cases the diagnostics computer includes a display and wherein the step of presenting the conflicting application programs includes presenting the conflicting application programs via the display. In some cases the conflict list includes application program types and application program versions for at least a subset of the application program types.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIG. 9 is similar to FIG. 7, albeit showing board data;

DETAILED DESCRIPTION OF THE INVENTION

Figure 23:
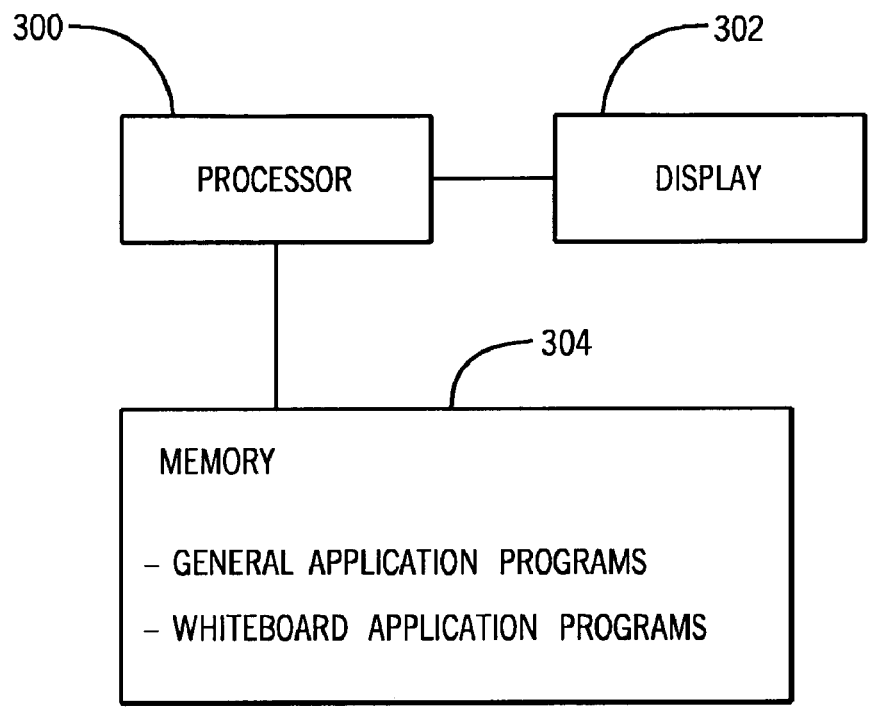
FIG. 23 is a schematic illustrating local computer components.

Referring to the figures wherein like reference numbers correspond to similar elements throughout the several views and more specifically, referring to FIG. 1, the present invention will be described in the context of an exemplary whiteboard system 10 that includes a projector 12, a whiteboard 14, a local computer 20 (e.g., a laptop or PC), a remote computer 24, a database 26 and a network 22 (e.g., the Internet, a local area network (LAN), etc.). The local computer 20 is linked to each of the whiteboard 14 and the projector 12 to control information projected onto the whiteboard and to obtain information from the whiteboard 14 associated with activities that occur on the board to change information displayed thereon. Referring also to FIG. 23, local computer 20 includes a processor 300, a display 302 and a memory 304. Local computer 20 stores programs in memory 304 and runs whiteboard application programs as well as a video driver program for driving projector 12. In addition, in at least some embodiments computer 20 stores and runs other general application programs (see FIG. 23) that can be used independent of whiteboard 14 or in conjunction therewith such as, for instance, MS word, MS power point, Excel, etc.

Whiteboard 14 includes, among other components, a touch sensitive surface 18. Touch sensitive surfaces like surface 18 are well known in the art and therefore the surface technology is not explained here in detail. Surface 18 may include any of several different types of touch sensitive sensing mechanisms such as laser sensors, ultrasonic sensors, capacitive sensors, etc. and many of the inventive aspects described herein may be used with any type of surface sensing system. In many cases touch sensitive sensor systems have to be calibrated prior to use and the way in which images displayed thereon via a projector 12 or the like align with the sensing surface 18 has to be determined and used to program the whiteboard sensing processor. Hereinafter all of the data generated during a commissioning procedure to calibrate a sensing surface and to align a projected image with the sensing surface will be referred to as calibration data.

Exemplary whiteboard 14 is a Lighting TSL/WnTL board and includes a plurality of fiber optic light sensors, three of which are collectively identified by numeral 16. The sensors 16 are illustrated as relatively large phantom sensors for the purposes of this explanation while, in reality, the sensors are extremely small and generally unnoticeable on the surface of the whiteboard. The precise locations of the sensors 16 are determined when after the whiteboard 14 is manufactured and are then stored in database 26 for subsequent access. Similarly, the precise locations of the upper, lower, left and right boundaries of the whiteboard surface 18 are determined after manufacturing and are stored in database 26.

To precisely align specific points on the whiteboard surface 18 with specific points within the projected image, during a calibration process a calibration image that includes a specific light pattern is projected onto the whiteboard surface 18 and the light sensors 16 are used to determine the precise dimensions and orientation of the projected image. Thereafter, surface 18 points are calibrated with the projected image points and the calibration information or data is stored for use during normal system operation.

Moreover, whiteboard 14 may include a plurality of indicator lights (i.e., illumination devices) 30 and other output devices such as audio generating speakers/devices, etc. For instance, one LED 30 may indicate when the whiteboard system 10 is turned on, one LED may indicate when projector 12 is on, one LED may indicate when red is the selected pen color, another LED may indicate when green is the selected pen color, another LED may indicate when a wide erase feature has been selected, etc.

Figure 1:
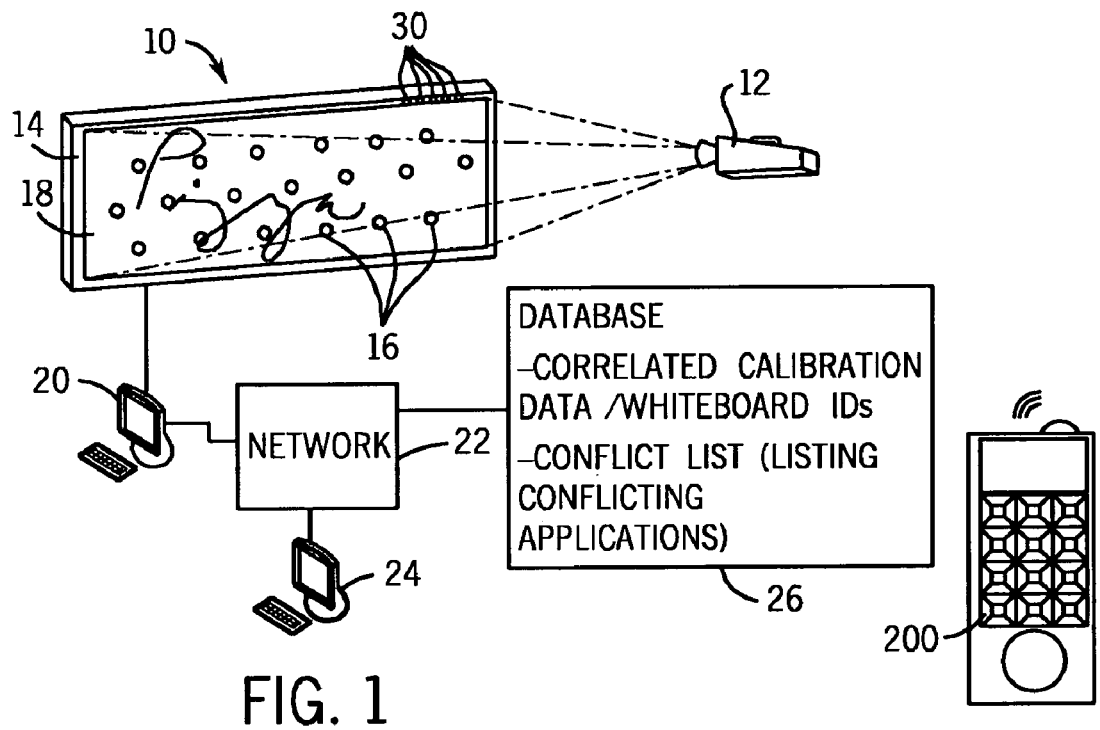
FIG. 1 is a schematic view illustrating an exemplary electronic whiteboard system and remote diagnostics computer that is consistent with at least some aspects of the present invention.

Referring still to FIG. 1, local computer 20 runs whiteboard application software to control whiteboard 14 as well as projector 12. Thus, the computer application may be a drawing type application that allows a user to place scripted information on the display screen (see FIG. 1). When a stylus or the like is used to make a curve on the whiteboard surface 18, the surface sensors sense the changing location of the stylus tip and generate X and Y coordinate data streams that are provided to the computer 20. Computer 20 changes the X and Y coordinates into a stroke and adds the stroke to the projected image thereby adding the intended stroke to the whiteboard surface 18. In other embodiments where an ink pen is used to draw on the sensor surface 18, the strokes or curve segments generated from the X and Y coordinates are stored in a computer memory associated with computer 20 and may be used to generate a digital image via the display screen associated with computer 20 that mirrors the ink image on the board surface 18.

Figure 2:
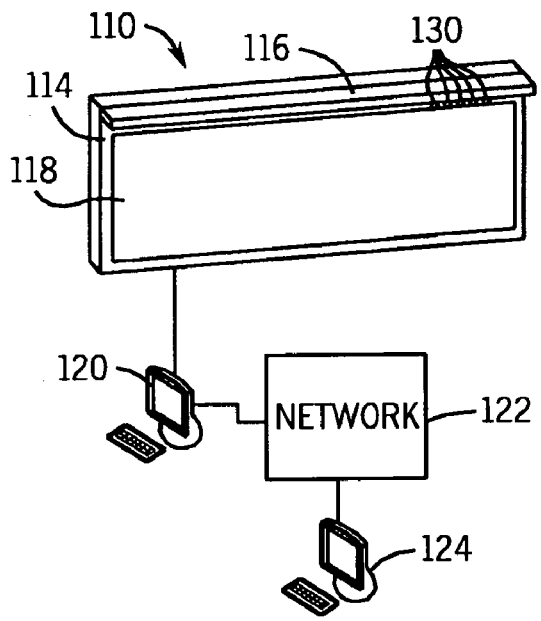
FIG. 2 is similar to FIG. 1, albeit showing a system including a different type of electronic whiteboard.

Referring to FIG. 2, a second exemplary whiteboard system 110 is illustrated that includes many components that are similar to the components described above with respect to FIG. 1. In FIG. 2, components that are similar to FIG. 1 components are labeled with the same numbers used in FIG. 1 incremented by 100. Thus, for instance, where the local computer in FIG. 1 is labeled 20, in FIG. 2 the local computer is labeled 120. The primary difference between the FIG. 1 and FIG. 2 systems 10 and 110, respectively, is that the FIG. 2 system 110 does not include a projector 12 and instead includes a plasma or LCD type display whiteboard 114 that includes a surface 118. Here, a position sensor system 116 is included with the electronic display for sensing when a pen, stylus, finger tip or the like is adjacent the surface 118. While various sensor systems 116 may be used here, one exemplary and known system includes lasers that pass laser beam light rays across the surface 118 to sense the location of the stylus or the like. Other position sensor systems are contemplated. Many of the inventive concepts are applicable to either of the systems illustrated in FIGS. 1 and 2 or indeed to other systems that have other sensor mechanisms.

Figure 24:
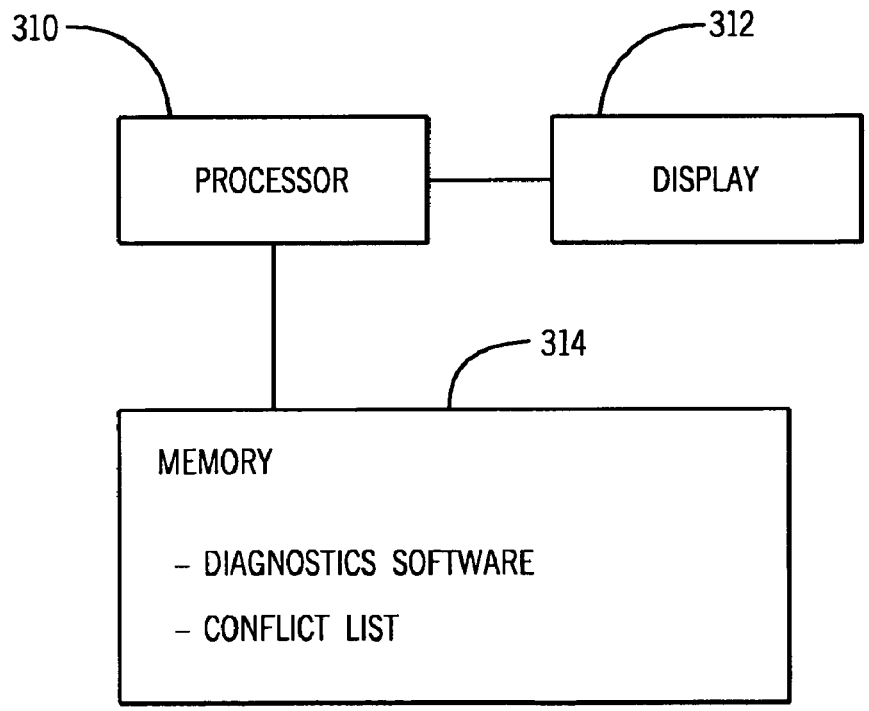
FIG. 24 is a schematic illustrating remote computer components.

Referring again to FIG. 1 and also to FIG. 24, remote computer 24 includes a processor 310, a display 312 and a memory 314. According to at least one inventive aspect of the present invention, remote computer 24 can be used to link to local computer 20 and to run diagnostics software configured to generate information that can be used to narrow the causes of malfunctioning whiteboards 14. Here, the diagnostic features contemplated are over and above allowing a remote user to control the whiteboard in the usual fashion to alter the whiteboard image. Instead, the diagnostic features contemplated allow a remote user to interact with a local user to diagnose different problems. To this end, in some cases the diagnostic features generate data associated with a local user's input to the whiteboard 14 that can be used to diagnose problems. For instance, in at least some cases after a remote user has linked to the local computer and when the diagnostic application is run, when the local user uses a stylus or the like to make a mark on surface 18, the raw X and Y coordinate data is generated and provided to the remote computer user to be viewed. Thus, the local user interacts with the whiteboard surface 18 to input image changing information and the remote computer reports the information in a raw data format as streaming data.

As another example, the remote computer user may send signals to the local computer to light up certain ones of the indicator LEDs 30 where, if an LED does not illuminate when a signal is sent, the failure to illuminate indicates that the LED is burnt out. In the alternative, if an LED illuminates when powered, it can be determined that something other than the LED is causing a perceived whiteboard malfunction.

In still other cases, the remote computer may be used to sense how much light is being sensed by each of the optic fiber sensors 16 to determine when one of the sensors is malfunctioning, is blocked, etc. In other cases the remote computer 24 may be used to reset various whiteboard information when the information is lost or corrupted in some fashion such as, for instance, the precise locations of the sensors 16, the upper, lower, right and left boundaries of the surface 18, how a projected image aligns with a whiteboard surface 18, etc. Other diagnostic concepts are contemplated.

Here, in at least one case it is contemplated that each of the remote and local computers may have a version of the diagnostic application software loaded thereon where, when the remote computer is used to diagnose, the remote computer links to the local computer and operates there through to control various whiteboard features as well as to receive whiteboard data as feedback. In other cases an exchange server may be positioned inside the network 22 for exchanging information between the remote and local computers. The exchange server is useful when the remote and local computers are separated by a firewall.

Figure 3:
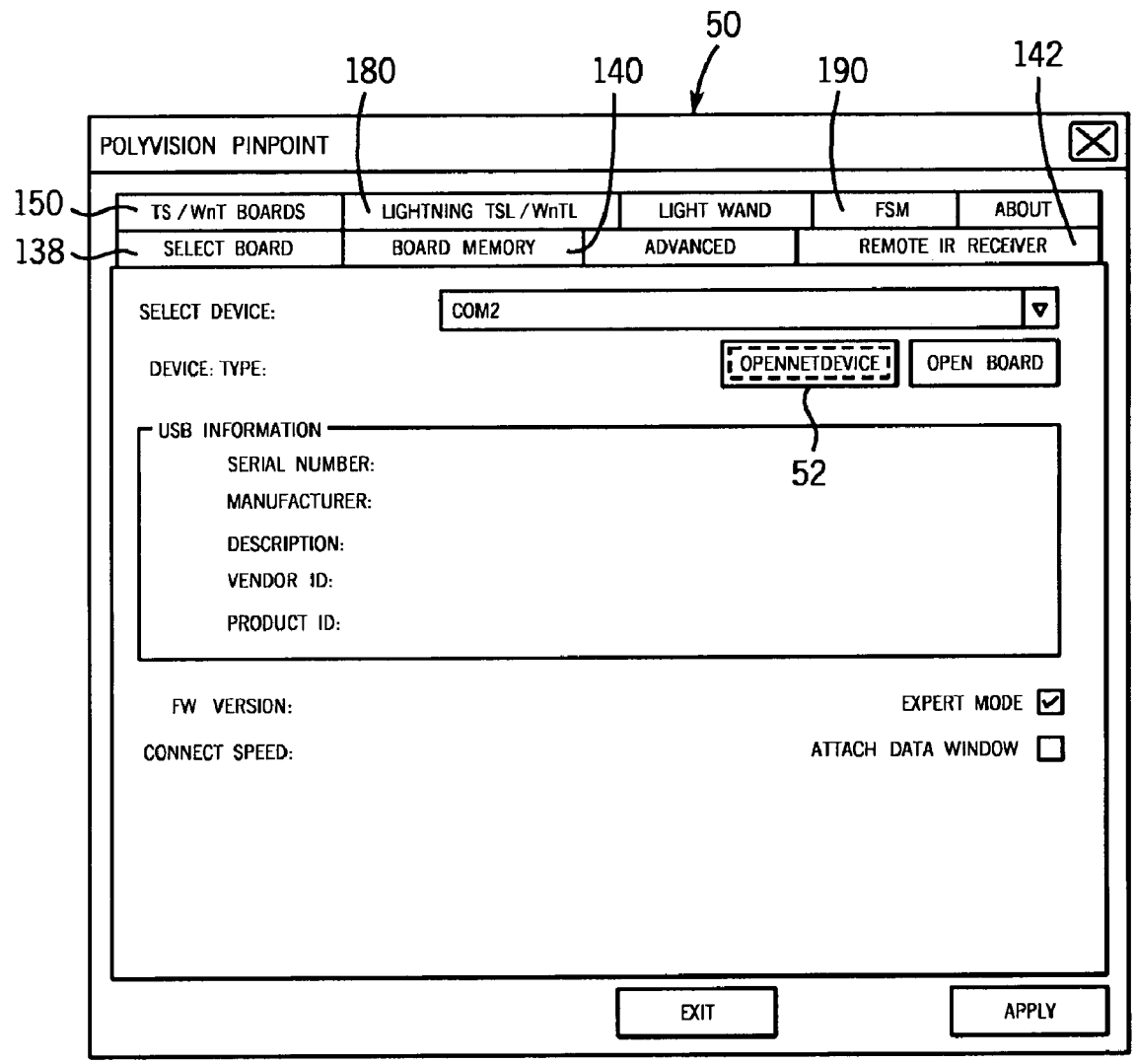
FIG. 3 is an initial diagnostics software image that may be presented via the remote computer shown in FIG. 1.
Figure 4:
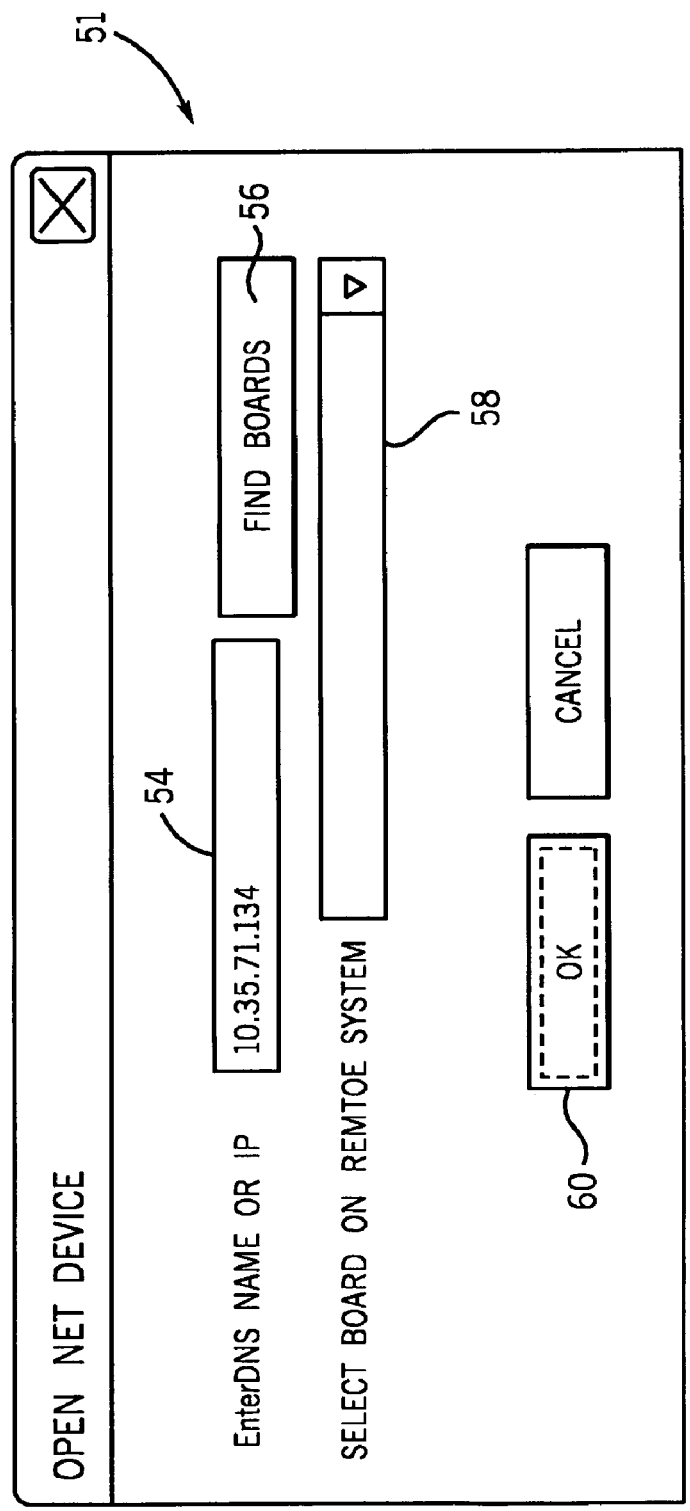
FIG. 4 is a window view that may be presented via the remote computer of FIG. 1 for linking to the local computer shown in FIG. 1.
Figure 5:
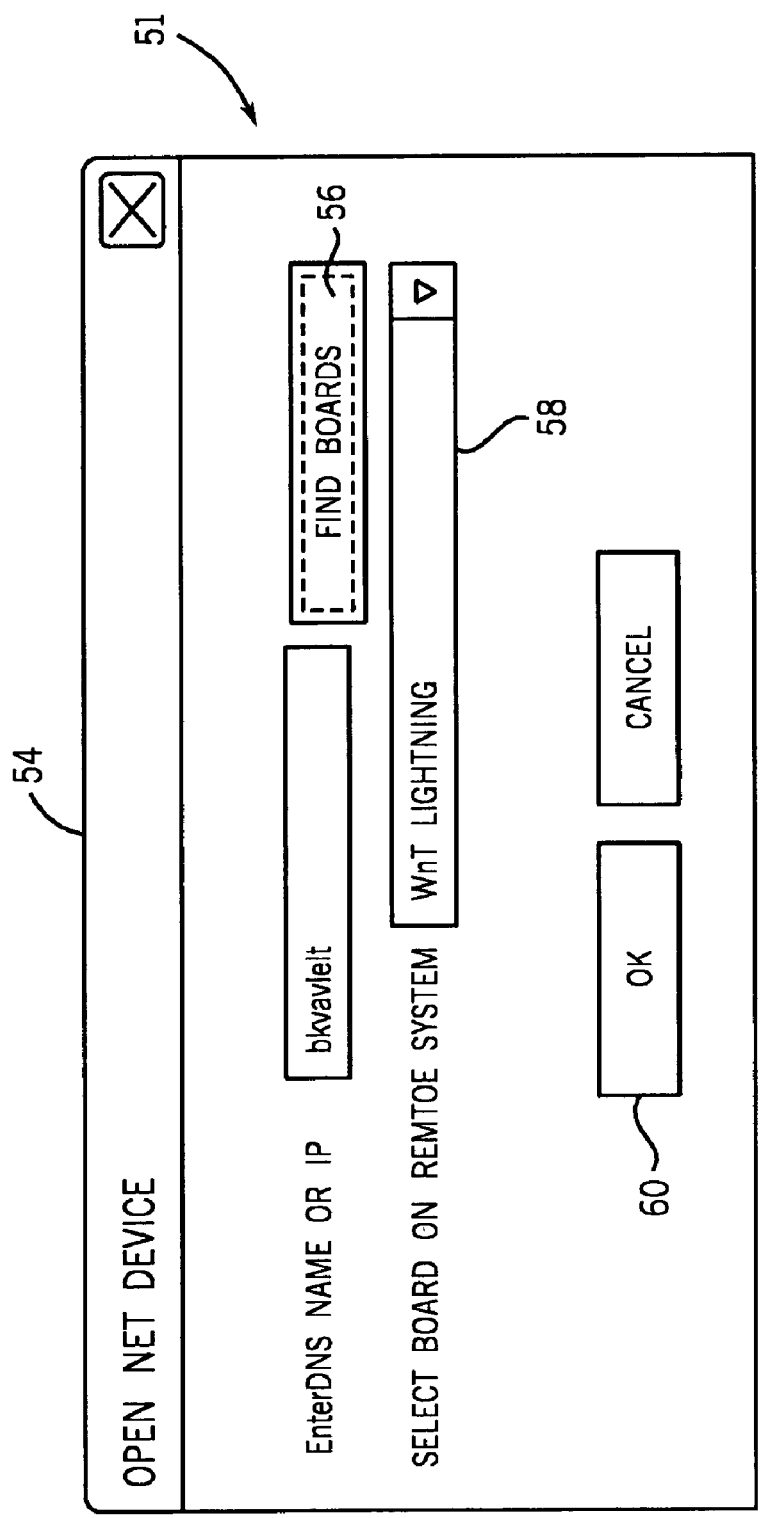
FIG. 5 is similar to FIG. 4, albeit showing data corresponding to a different point during a computer linking process.

Referring now to FIG. 3, an exemplary initial diagnostics computer screen shot 50 is illustrated that includes a plurality of tab buttons (e.g., 138, 140, 142, etc.) at the top and an information section there below. Screen shot 50 may be provided to a remote technician via remote computer 24. When a Select Board tab 138 is selected an information screen is opened that includes, among other things, an "OpenNetDevice" button 52. When button 52 is selected using a mouse controlled cursor or the like, the window 51 shown in FIG. 4 is opened that includes an IP address field 54, a "Find Boards" button 56, a board selection field 58 and an OK button 60. When an address is entered in field 54 and button 56 is selected, in the illustrated example, after linking to the IP address and as shown in FIG. 5, a name associated with the address is used to replace the address in field 54 and one of the boards associated with the address is provided in field 58. Field 58 is associated with a drop down menu that can be used to change the board indicated in field 58.

Figure 6:
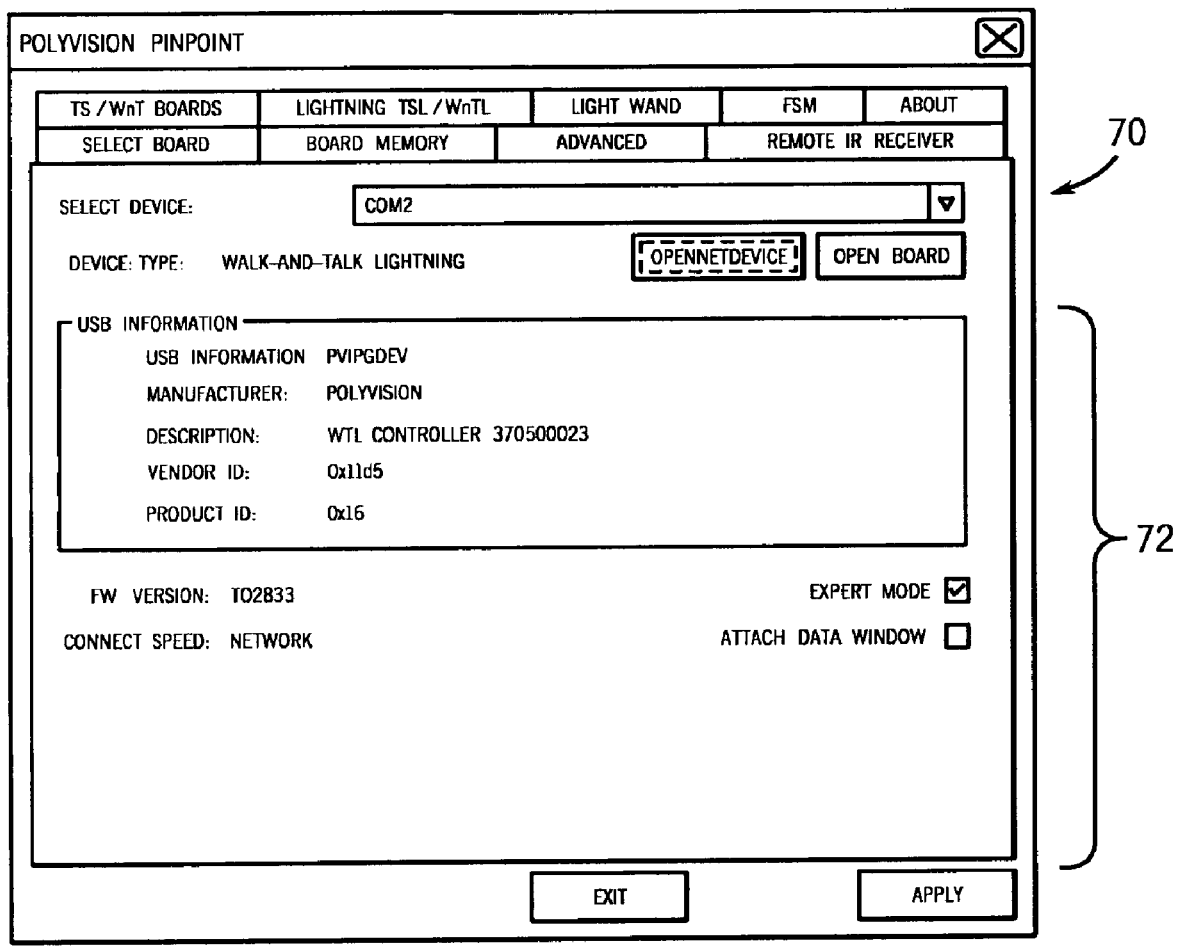
FIG. 6 is similar to FIG. 3, albeit showing information after a link between a remote computer and a local computer has been competed.
Figure 7:
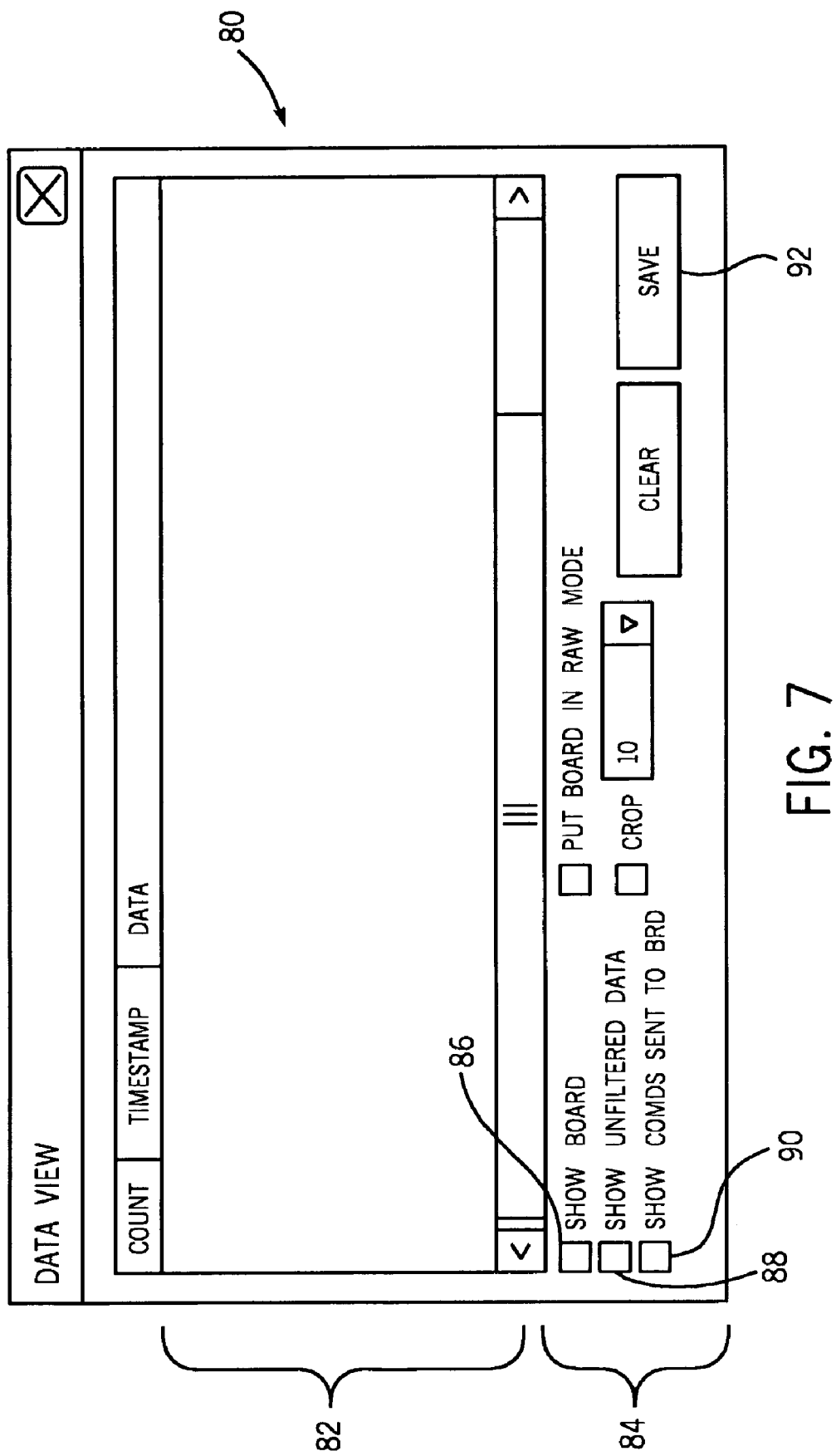
FIG. 7 is a data view window that may be opened via the remote computer shown in FIG. 1 for reviewing data related to an electronic whiteboard.

Once the desired board to remotely diagnose is indicated in field 58, when OK button 60 is selected, two windows are opened including a remote link identification window 70 shown in FIG. 6 and the "Data View" window 80 shown in FIG. 7. The identification window 70, as the label implies, provides information related to the identification of the whiteboard to which the remote computer is linked—see information in section 72. The Data View window 80, as the label implies, is provided to allow a user to view data associated with actions performed by a local whiteboard user. The Data View window includes a data section 82 and a menu section 84 near the bottom of the window that allows a user to select the types of data to view. The menu allows a user to select to view the actual information that is presented via the whiteboard surface 18 (see button 86), to view unfiltered X and Y data (see button 88) and to view the commands (e.g., turn on red LED, turn on fan, etc.) that are sent to the board (see button 90). The menu also allows a user to save data by selecting save icon 92.

Figure 8:
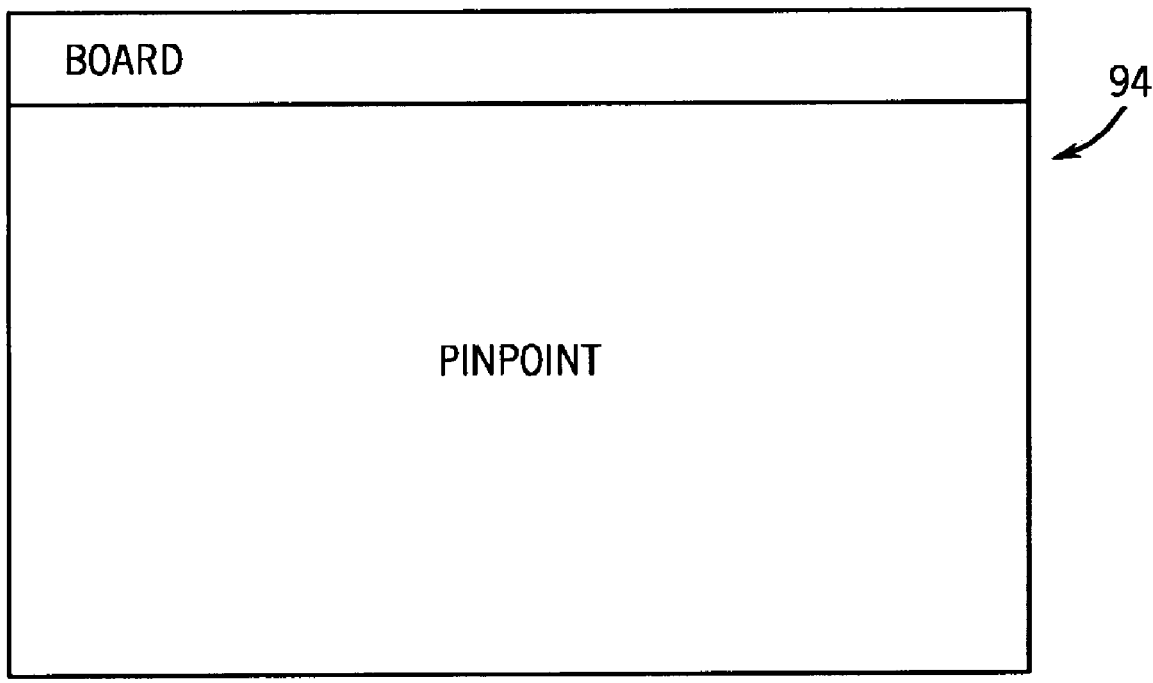
FIG. 8 is a board view that may be opened via the remote computer shown in FIG. 1 for viewing the current image displayed via a linked electronic whiteboard.

After a remote user links to whiteboard 14 and has selected button 86 to show board content (see selected button 86 in FIG. 9), another window 94 as shown in FIG. 8 is opened to allow the remote user to view an actual whiteboard image that is presented on surface 18 (see again FIG. 1). When the unfiltered data button 88 is selected, as the label implies, time stamped raw X and Y coordinate data pairs are generated as shown in the Data View window 80 of FIG. 9. In window 80, as objects are added to the board, an X and Y coordinate data stream is presented in area 82 of window 80. In FIG. 9 the last two numbers in each row of data in section 82 correspond to X and Y coordinates and therefore can be used to determine if a system is operating properly. For instance, if a local user of board 14 is making a diagonal line on surface 18 but the Y coordinate sensor is not working properly, while the X coordinate may be changes as expected, the Y coordinate in section 82 may not be changing (i.e., may be stuck on number 2000). Here, a problem would be diagnosed and the cause could be narrowed down by the remote user applying some expertise.

Figure 10:
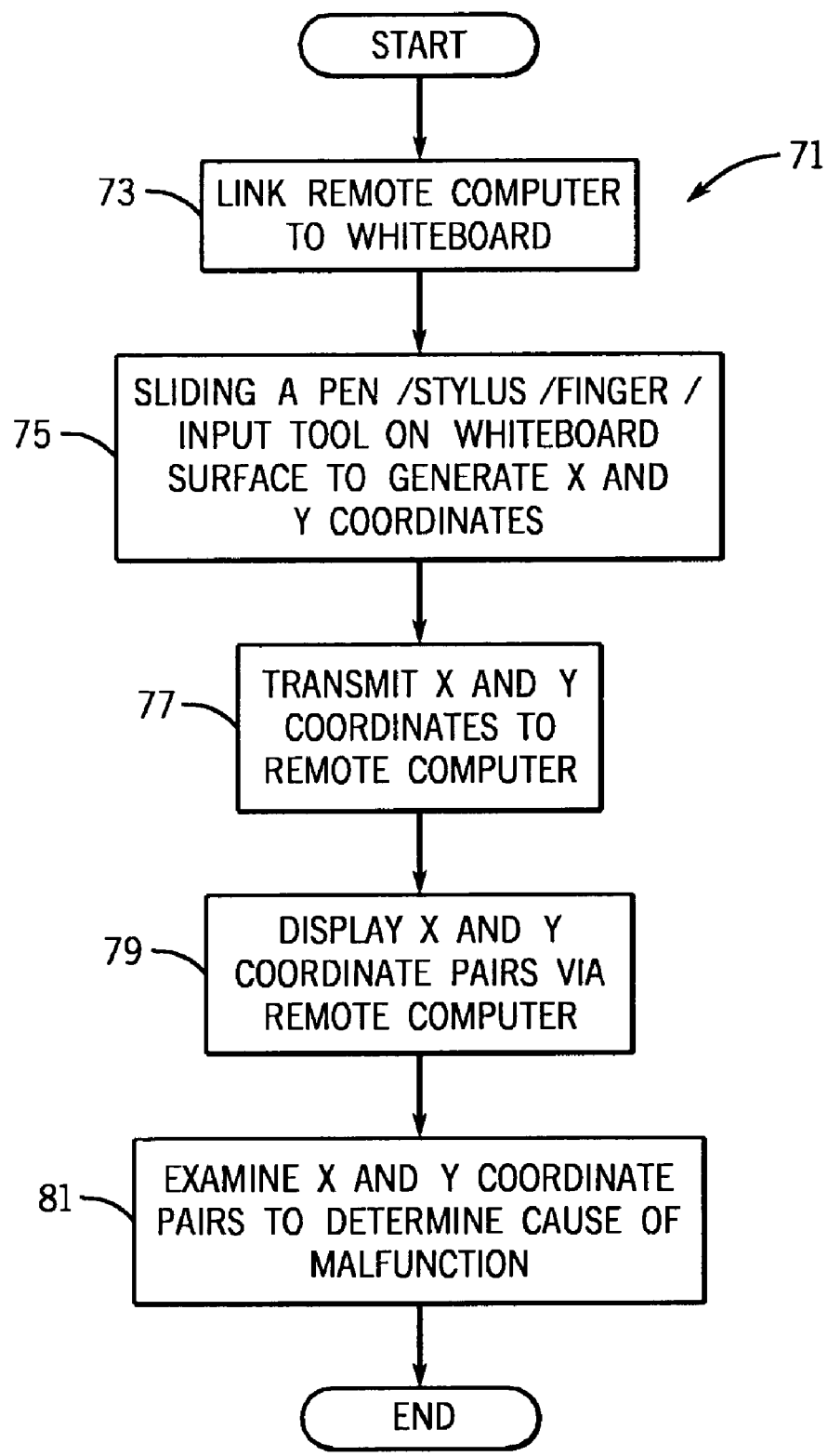
FIG. 10 is a flow chart illustrating a method whereby raw X and Y coordinate data is generated and presented via the remote computer of FIG. 1 for a technician to view.

Consistent with the above comments, referring to FIG. 10, an exemplary method 71 is illustrated wherein a local user of board 14 provides input via surface 18 to interact therewith and where raw X and Y coordinate data is provided to a remote technician or the like in real time so that the technician can attempt to ascertain the cause of a malfunction. In this regard, at block 73, remote computer 24 is linked to computer 20 (i.e., to the whiteboard system). At block 75 a local whiteboard user interacts with the sensing surface 18 by sliding a pen/stylus/finger or other input device along surface 18 causing the sensor system associated with surface 18 to generate raw X and Y coordinate data.

Continuing, at block 77, the X and Y coordinate data is transmitted to remote computer 24 and at block 79 the remote computer 24 displays the raw X and Y coordinate data pairs as shown in FIG. 9. At block 81 the remote technician examines the X and Y coordinate pairs to attempt to identify the cause of a perceived malfunction. For instance, if a Y coordinate is not changing despite the fact that the local user is moving a pen along the surface 18 in the Y direction, it can be determined that the Y axis sensor is not working for some reason. As another example, if the local user is drawing a straight line substantially parallel to the X axis of the whiteboard but the Y coordinate is varying appreciably, it may be ascertained that the Y sensor is not working properly.

Figure 11:
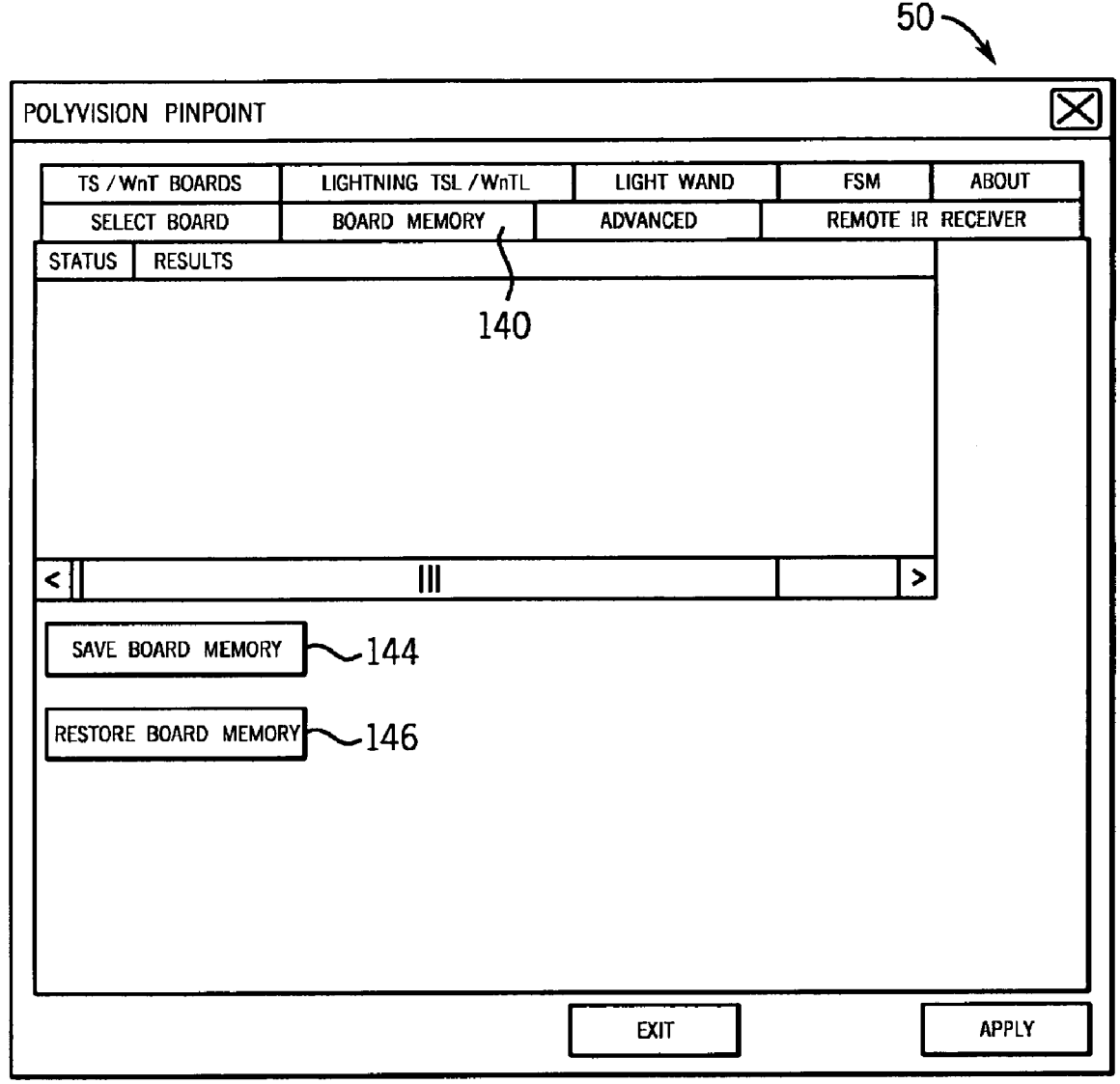
FIG. 11 is an image showing information presented when the board memory tab of FIG. 3 is selected.

Referring to FIG. 11, by selecting a Board Memory tab 140 on the initial screen 50 (see also again FIG. 3) other information is provided including a Save Board button 144 and a Restore Board button 146 Here, board memory corresponding to the linked board 14 including sensor 16 locations as well as other calibration data or set up information can be downloaded from the board 14 prior to messing with the board via diagnostic procedures. After the diagnostic processes are completed, if desired, the data saved can be reloaded to the board to enable the board to operate in the same fashion as before the diagnostic process was started.

Figure 17:
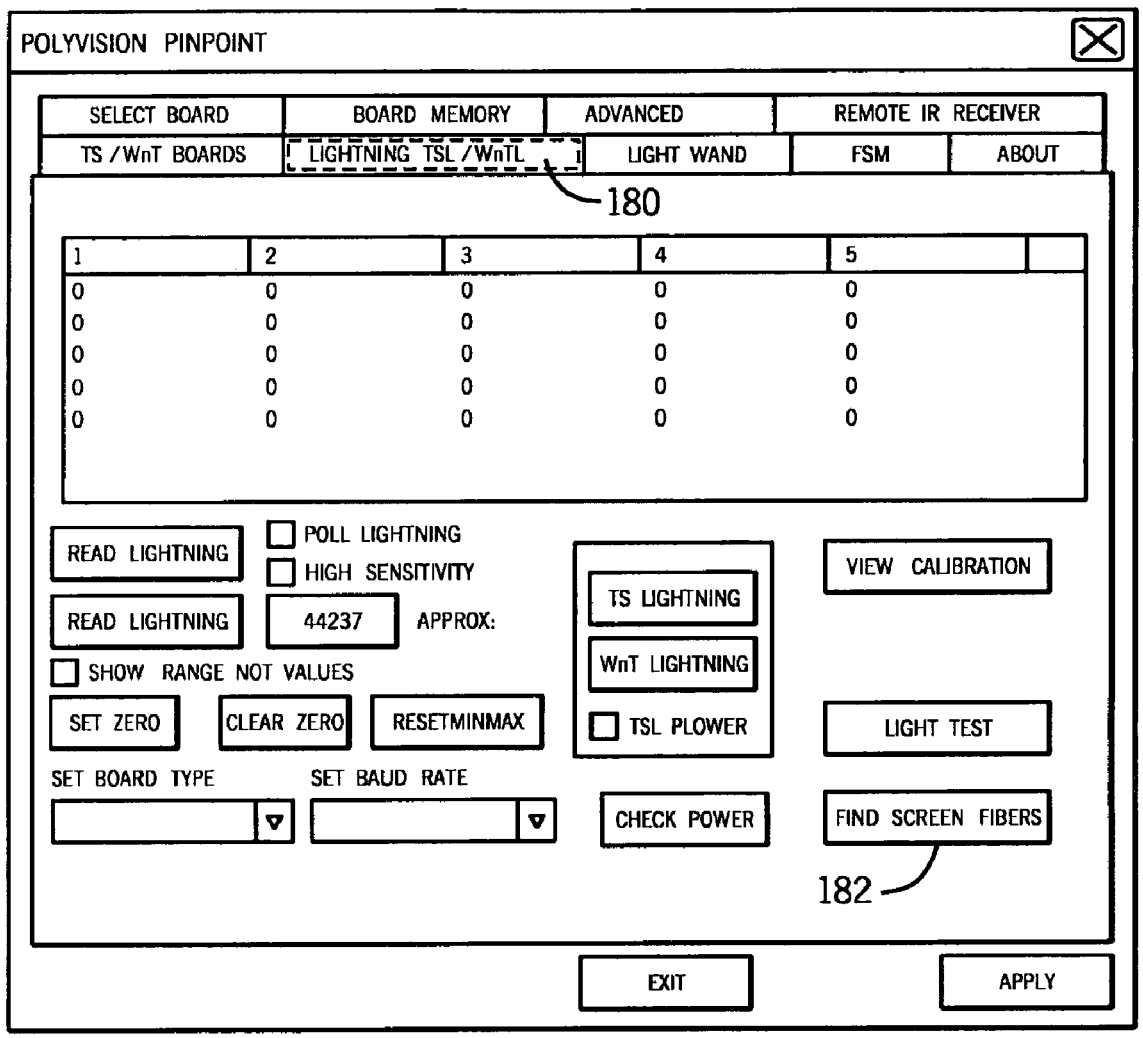
FIG. 17 is an image showing various diagnostic tools and processes that may be performed via the remote computer shown in FIG. 1 when the remote computer is linked to a second type of electronic whiteboard.
Figure 19:
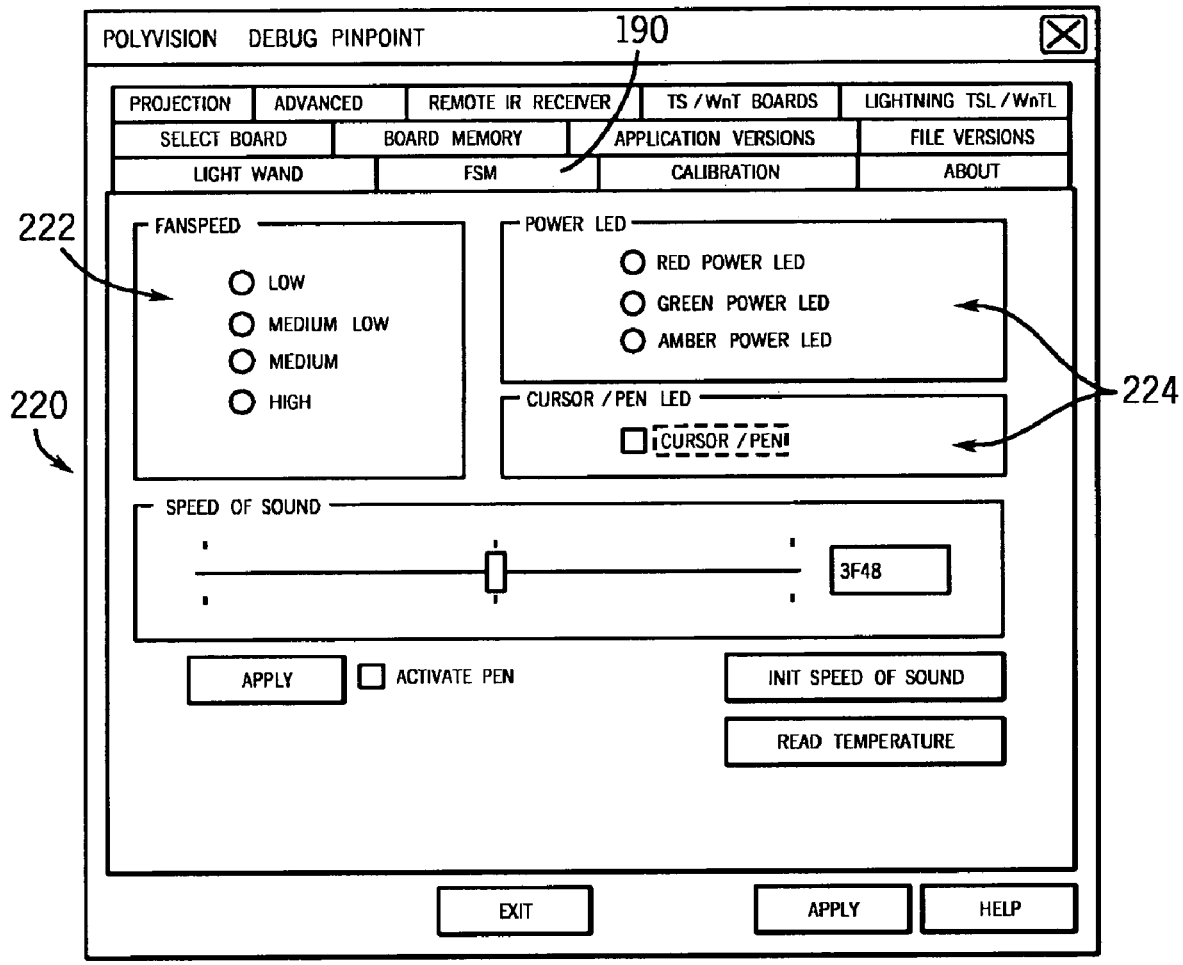
FIG. 19 is an image illustrating various diagnostic tools and procedures that may be performed by the remote computer shown in FIG. 1 when the remote computer is linked to a third type of electronic whiteboard.

Referring again to FIG. 3, several of the tabs at the top of the screen shot 50 indicate different types of whiteboard assemblies that are being linked to for diagnostic purposes where the different board types have different features that can be controlled and where there are different tests for the different board types. To this end, three board type tabs include a TS/WnT Boards tab 150, a Lightning TSL/WnTL tab 180 and an FSM (flat screen monitor) tab 190. When tabs 150, 180 and 190 are selected, whiteboard type specific screen shots shown in FIGS. 12, 17 and 19 are provided via the remote computer 24.

Figure 12:
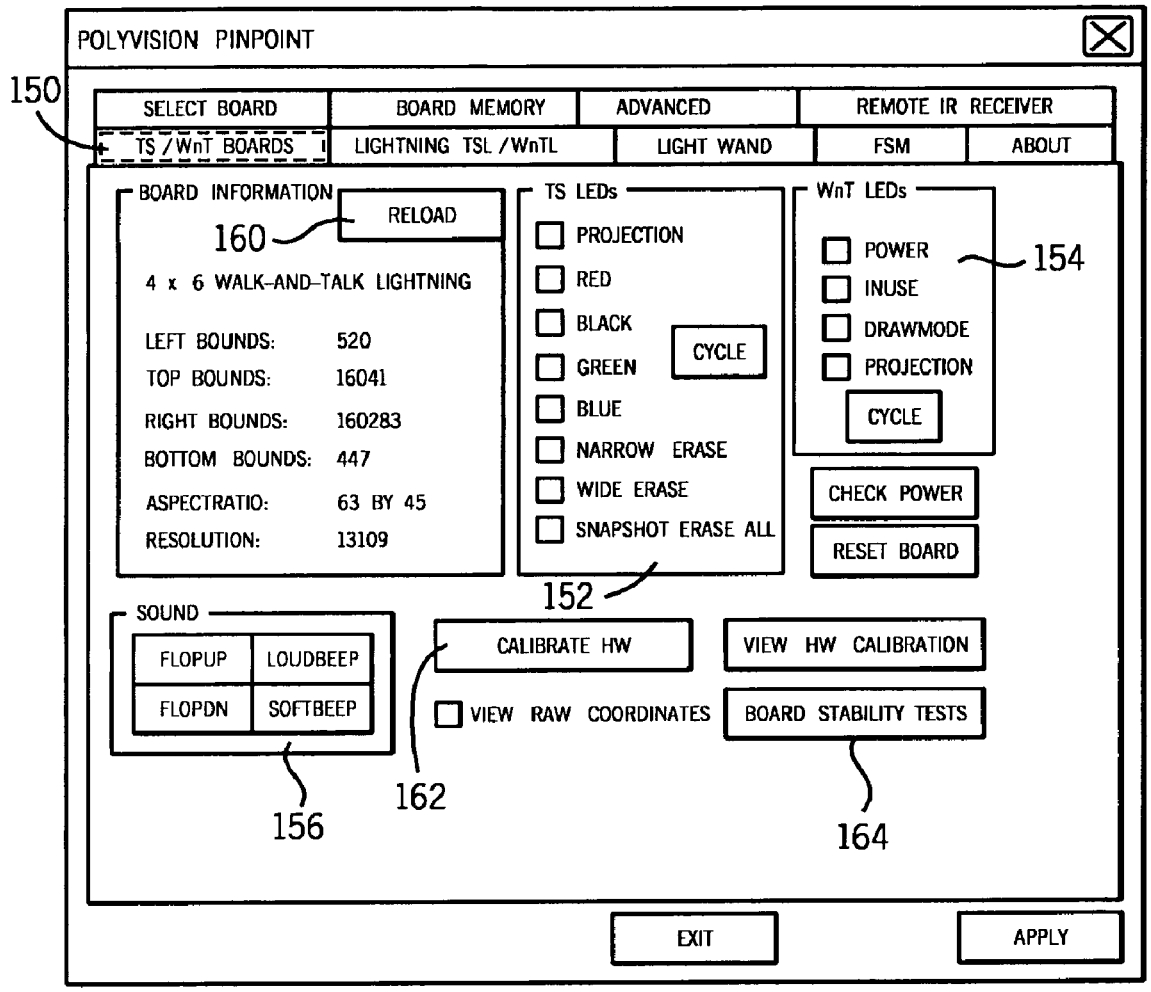
FIG. 12 is an image showing various diagnostic tools associated with a first type of electronic whiteboard.
Figure 13:
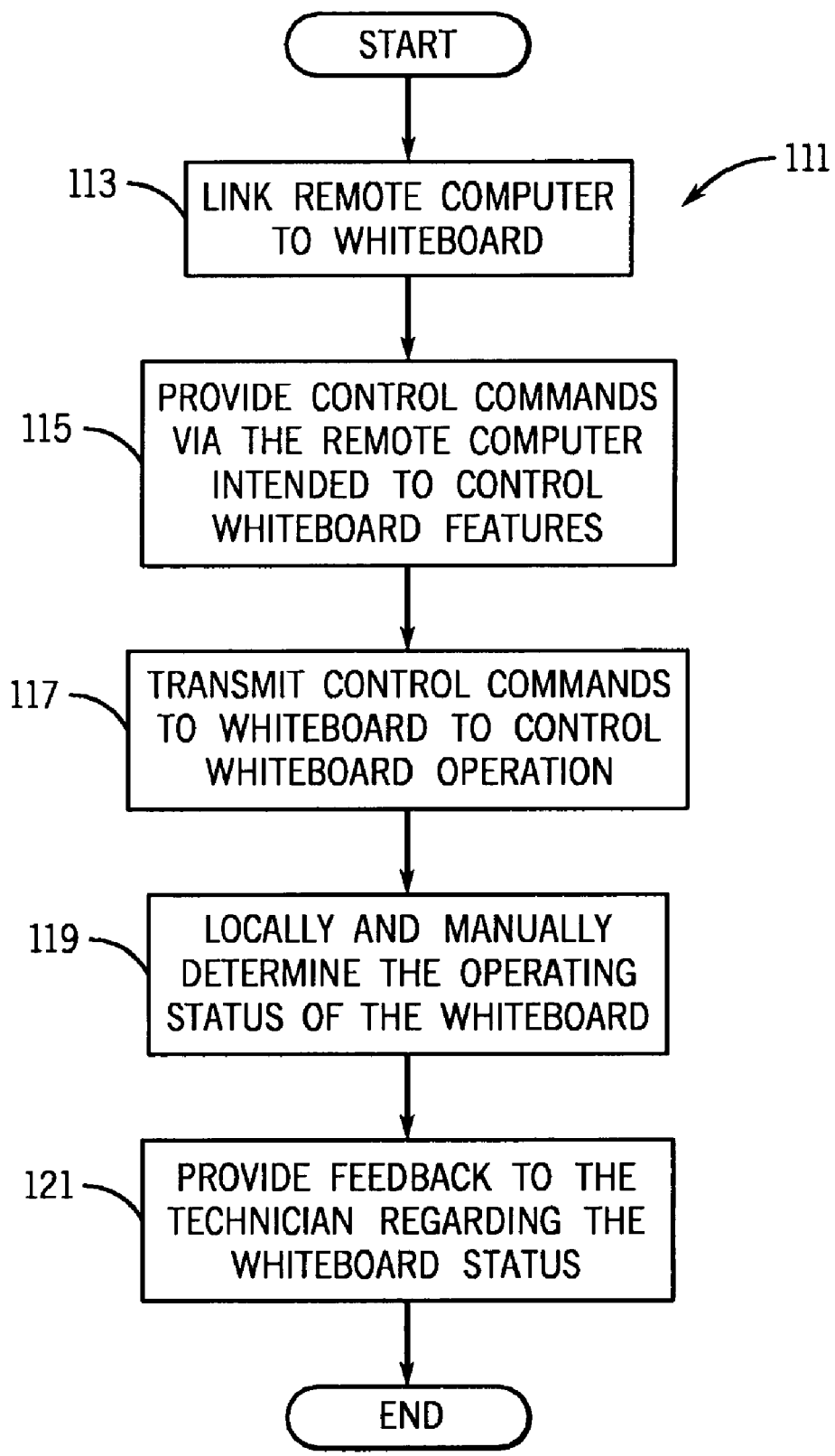
FIG. 13 is a flow chart illustrating another exemplary inventive method whereby a remote technician and a local user cooperate to facilitate a diagnostic process.

Referring to FIG. 12, when a TS/WnT Boards tab 150 is selected, as shown in FIG. 12, some controllable features include LEDs (see sections 152 and 154) and sound generation (see section 156). Here, when a technician uses a remote diagnostics computer 24 to control board activities, there is no way for the technician alone to confirm the end results of the commanded activities. Instead, the technician and a local user have to cooperate so that the technician has feedback regarding the results of the commanded actions. To this end, referring to FIG. 13, a method 111 by which a remote technician and a local user cooperate to facilitate a diagnostic procedure is illustrated. At block 113 the remote technician links the remote computer 24 to local computer 20 and thereby is linked to whiteboard 14. At block 115 the technician provides a control command for the whiteboard 14 via the remote computer 24 that is intended to control a whiteboard feature such as a specific whiteboard component. For instance, the command may require that a red LED be illuminated regardless of whether or not the operating characteristic or operating state of the whiteboard that is usually associated with the LED has occurred.

At block 117 the command is transmitted to the whiteboard. At block 119 the local whiteboard user observes the whiteboard and determines whether or not the commanded activity has occurred. In the above example the user observes the red LED and determines if the LED has lit up. Here it is contemplated that the remote technician and the local user will have some way of directly communicating such as via phone, e-mail, instant messaging, etc., so that the technician can let the local user know which portions of the whiteboard operation to observe at specific times.

At block 121 the local user provides feedback to the technician regarding the whiteboard status. In the LED example the user would indicate whether or not the red LED lit up when powered.

Referring again to FIG. 12, in addition to storing board calibration/set up data off board prior to performing diagnostics tests, board unique calibration data may be stored independent of the whiteboard system for each whiteboard system that can then be used to refresh or replace the calibration data in the whiteboard system if that data has been corrupted or is lost. To this end, after a board is installed and after commissioning/calibration processes have been performed, the calibration data generated can be transmitted to remote computer 24 which in turn stores that calibration information along with a unique whiteboard identifier in a computer memory (e.g., database 26). Thereafter, if the calibration data stored by board 14 is lost or is corrupted in some fashion, the remotely stored data can be accessed and used to recalibrate the board.

Figure 14:
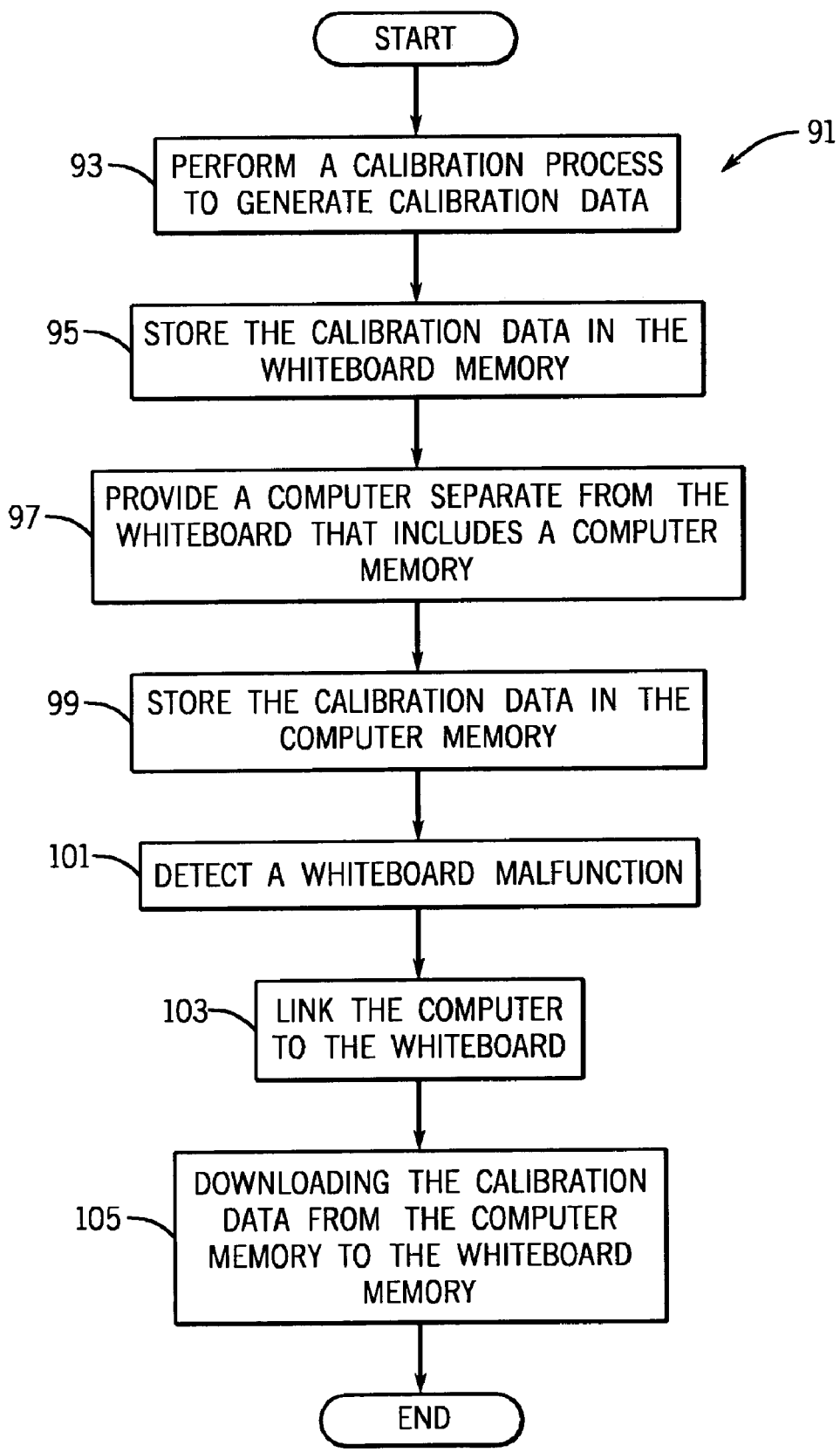
FIG. 14 is a flow chart illustrating another exemplary inventive method whereby whiteboard calibration data is remotely stored and used subsequently to refresh board calibration data.

An exemplary method 91 is shown in FIG. 14 for remotely storing calibration data for unique boards and for replacing existing board calibration data when a malfunction is detected. At block 93 a calibration process is performed for a specific board 14 to generate calibration data. At block 95 the calibration data is stored in a whiteboard memory. At block 97 remote computer 24 that has access to database 26 is linked to computer 20 and, while linked, at block 99, computer 24 receives the calibration data and stores that data in database 26 (i.e., in a computer memory).

Subsequent to storing the calibration data in the board memory and in remote database 26, when a malfunction occurs with the board 14 (i.e., surface 18 activity is not accurately tracked by the board sensors) (see block 101), a technician links remote computer 24 to computer 20 at block 103. At block 105 the technician can access the screen shot shown in FIG. 12 and can select icon 160 to replace the board memory with the previously stored calibration data. After the original calibration data is reloaded to the board memory, the whiteboard can again be used by a local user to determine if the malfunction has subsided.

Figure 15:
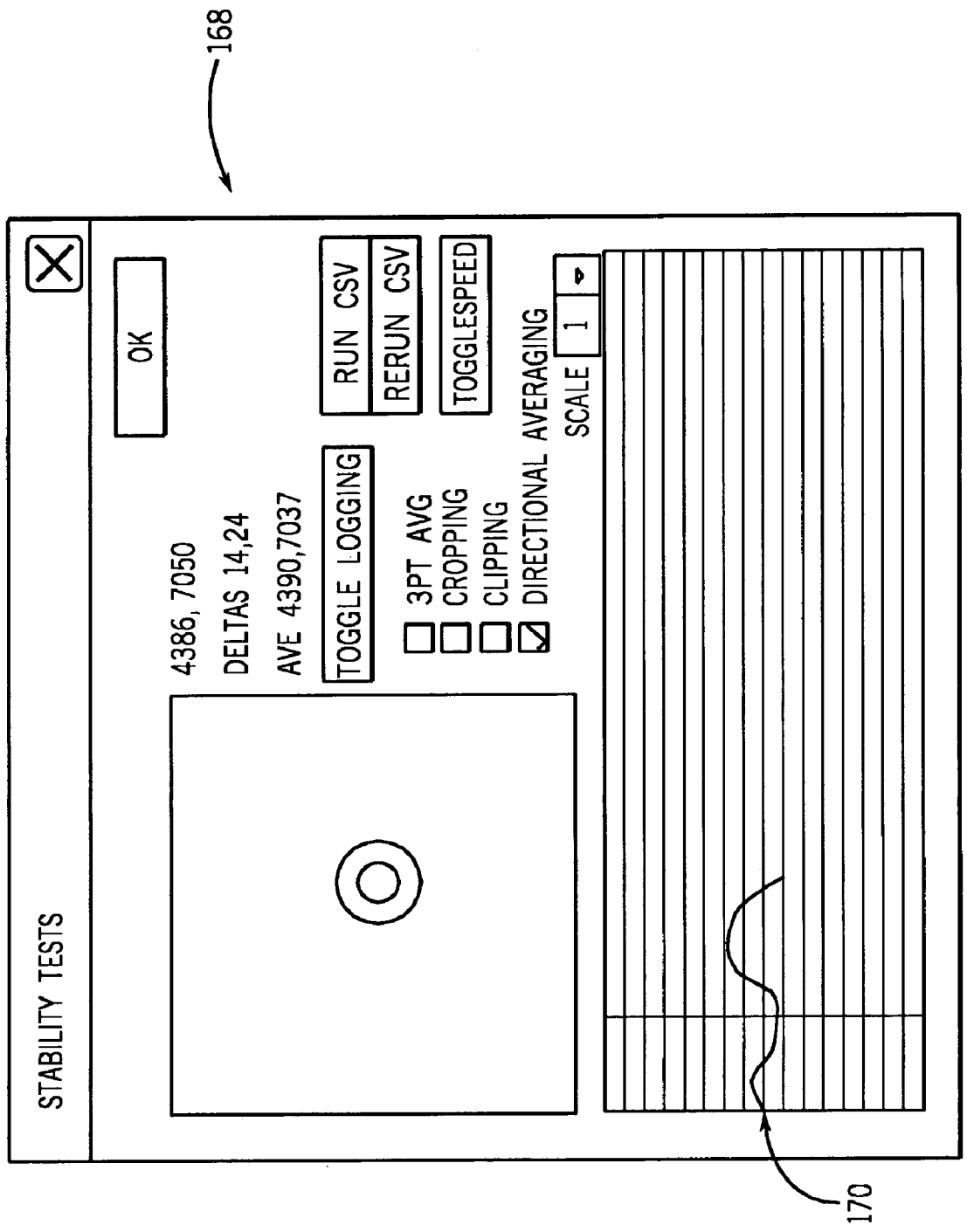
FIG. 15 is an image that may be provided via the remote computer shown in FIG. 1 for observing Y coordinate fluctuations.

Referring again to FIG. 12, a new hardware calibration process may be performed by selecting Calibration HW icon 162. A "Board Stability Tests" button 164 is selectable to open a new window 168 shown in FIG. 15 that allows a remote user to determine how stable the whiteboard system is operating. Here, when power to a whiteboard fluctuates it has been found that the Y coordinate sensed by the board may move about and generate error. A graph 170 near the bottom of window 168 shows Y axis movement when a finger or the like is placed in a single location on a whiteboard surface when power fluctuates. Here, if a local user is complaining about poor tacking this test can help a remote user diagnose the problem as a problem with the power source, not the whiteboard system.

Figure 16:
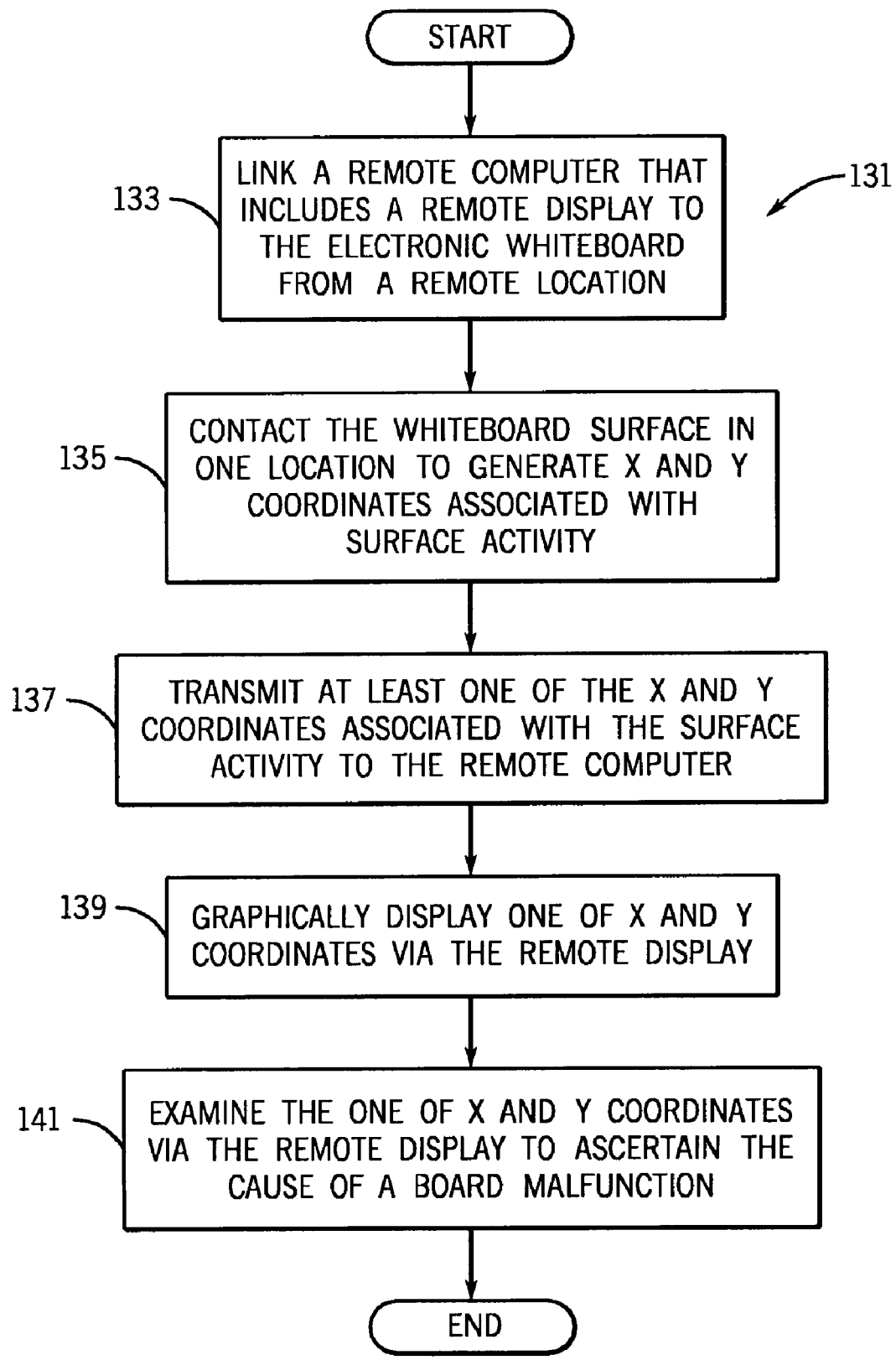
FIG. 16 is a flow chart illustrating an inventive method for generating the data shown in FIG. 15.

Referring to FIG. 16, a method 131 for testing board stability is illustrated. At block 133 a remote technician links to whiteboard 14 via computer 24. At block 135 a local whiteboard user contacts the whiteboard surface 18 at one location causing the whiteboard sensor system to generate X and Y coordinates. At block 137 one of the X or the Y coordinates is transferred to the remote computer 24. In the present case, because Y coordinates fluctuate when board power fluctuates, Y coordinates are transmitted to the remote computer 24. At block 139 the diagnostics application on computer 24 generates a graphical representation of the Y coordinates as a function of time (see again FIG. 15) and as block 141 the technician examines the graphical Y-coordinate representation to determine if undue Y coordinate fluctuations are occurring.

Referring to FIG. 17, when tab 180 is selected information related to the Lightning TSL/WnTL board types is provided that includes, among other information, information related to the optical fiber sensors 16 (see again FIG. 1) included in this type of board so that the remote technician can view information related to sensor 16 intensity and can determine if there is some problem with one of the sensors 16. In section 182 light intensity data for each of 25 sensors 16 is shown where the sensors are presumed to be arranged in five columns of five sensors. In the illustrated case none of the sensors are receiving light so all of the values are zeros. In addition, a "Find Screen Fibers" button 182 is selectable to cause the projector-whiteboard combination to cooperatively search for the light sensors 16 and to then project the positions of the light sensors 16 on surface 18. Here, where a light sensor malfunctions for some reason, the projected representation thereof floats out of the diagnostic pattern and therefore can be easily identified by a local user. Here, the local user would relay information about the floating representations to the remote technician.

Figure 18:
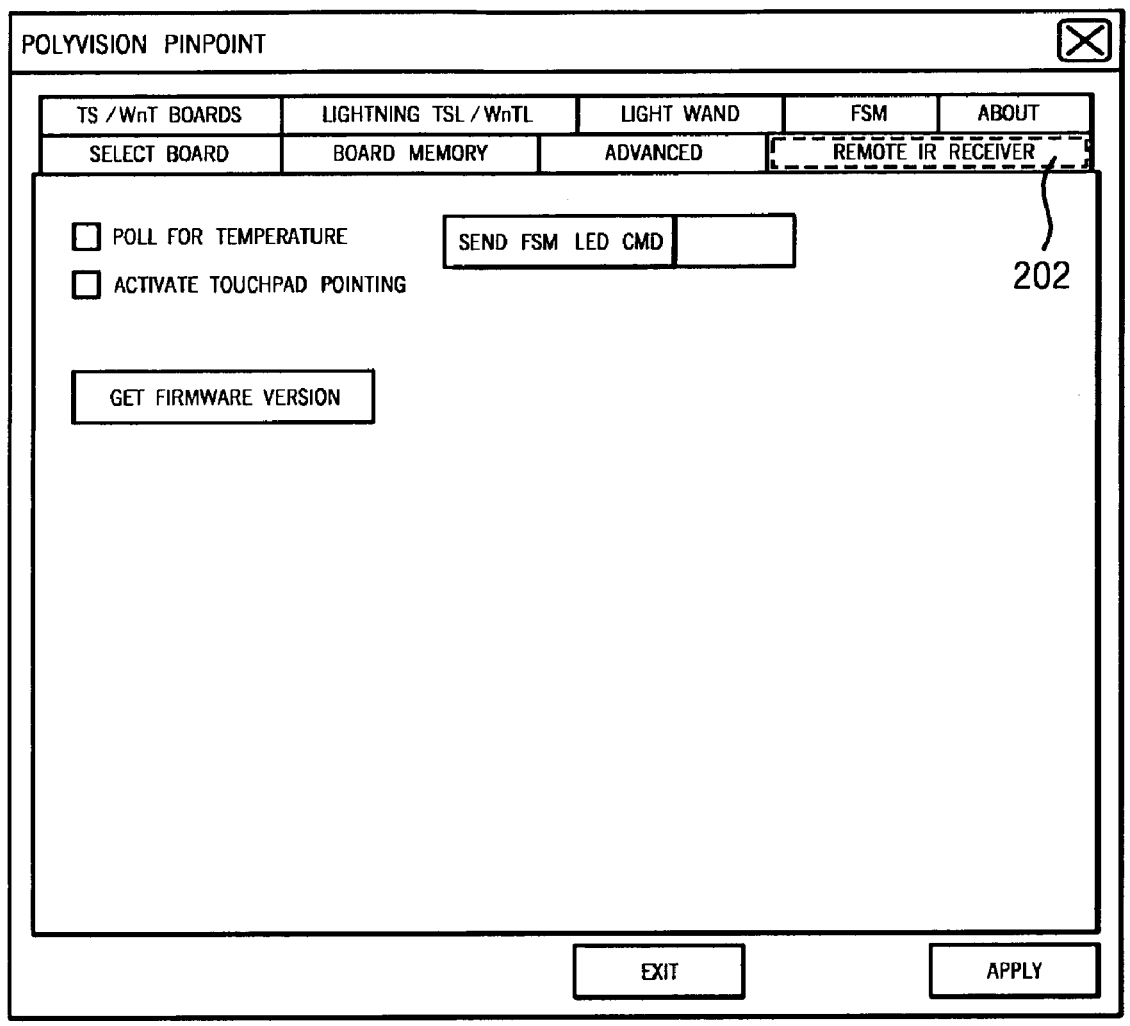
FIG. 18 is an image illustrating a remote receiver diagnostics page.

In some cases, as illustrated in FIG. 1, a remote wireless control 200 may be provided to be used with whiteboard 14. Here, the remote 200 may include a small screen for controlling a stylus icon or cursor on the whiteboard surface 18 and may include other input components such as keys or the like. In these cases it is contemplated that the remote computer 24 will also be useable to monitor operations of the remote device 200 and to generate data usable to diagnose the remote device operations. To this end, see FIG. 18 where Remote IR Receiver tab 202 has been selected and information related to a remote device is provided.

Referring to FIG. 19, a screen shot 220 is shown that includes information related to diagnostic tests and procedures that can be performed when the remote computer 24 is linked to an FSM type board including turning on a cooling fan (see 222) and controlling various LEDs (see 224).

Figure 20:
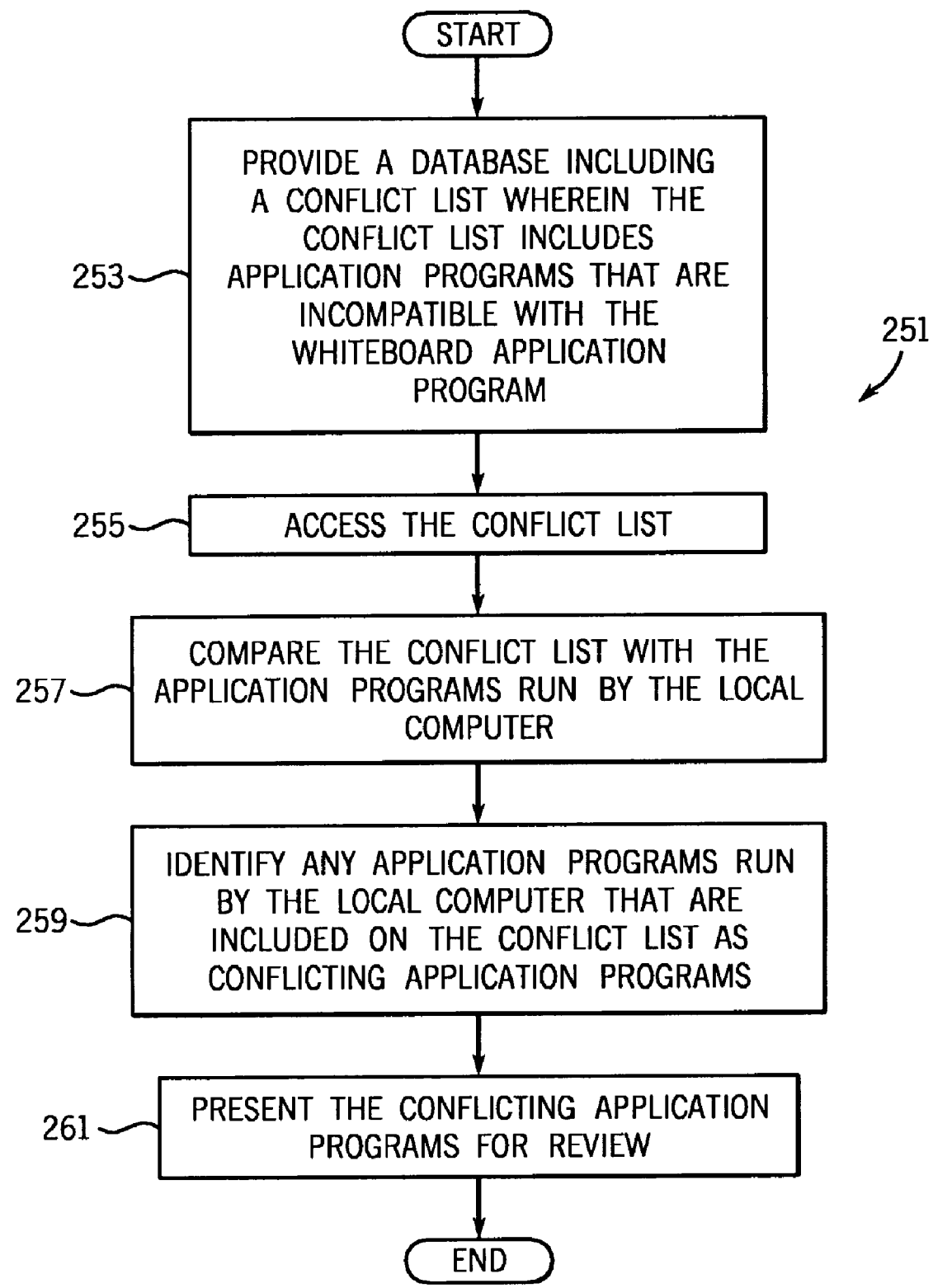
FIG. 20 is a flow chart illustrating an inventive method whereby conflicting application programs can be identified and flagged for a remote technician.

According to another aspect of the present invention, referring again to FIG. 1, database 26 may store a list of application programs that conflict with whiteboard application programs thereby causing errors or whiteboard malfunctions to occur. To help a remote technician determine if application conflicts occur, in at least some embodiments, computer 24 can be equipped to be able to identify applications run on the whiteboard controlling computer 20, compare those applications to the conflict list application (see FIG. 1) and to identify the conflicting applications for the technician via computer 24. To this end, an exemplary method 251 for identifying conflict application programs is illustrated in FIG. 20. At block 253 a database (see 26 in FIG. 1) is provided that includes a conflict list wherein the list includes application programs that are incompatible with whiteboard application programs. At block 255 remote computer 24 is used to access the conflict list. At block 257 the remote computer links to local computer 20 and obtains a list of the programs loaded onto and run by computer 20. In addition, at block 257, computer 24 compares the conflict list with the application programs run by the local computer 20. At block 259 remote computer 24 identifies any application programs run by the local computer that are included on the conflict list as conflicting applications and at block 261 computer 24 presents the conflicting application programs for the remote technician to review.

Figure 21:
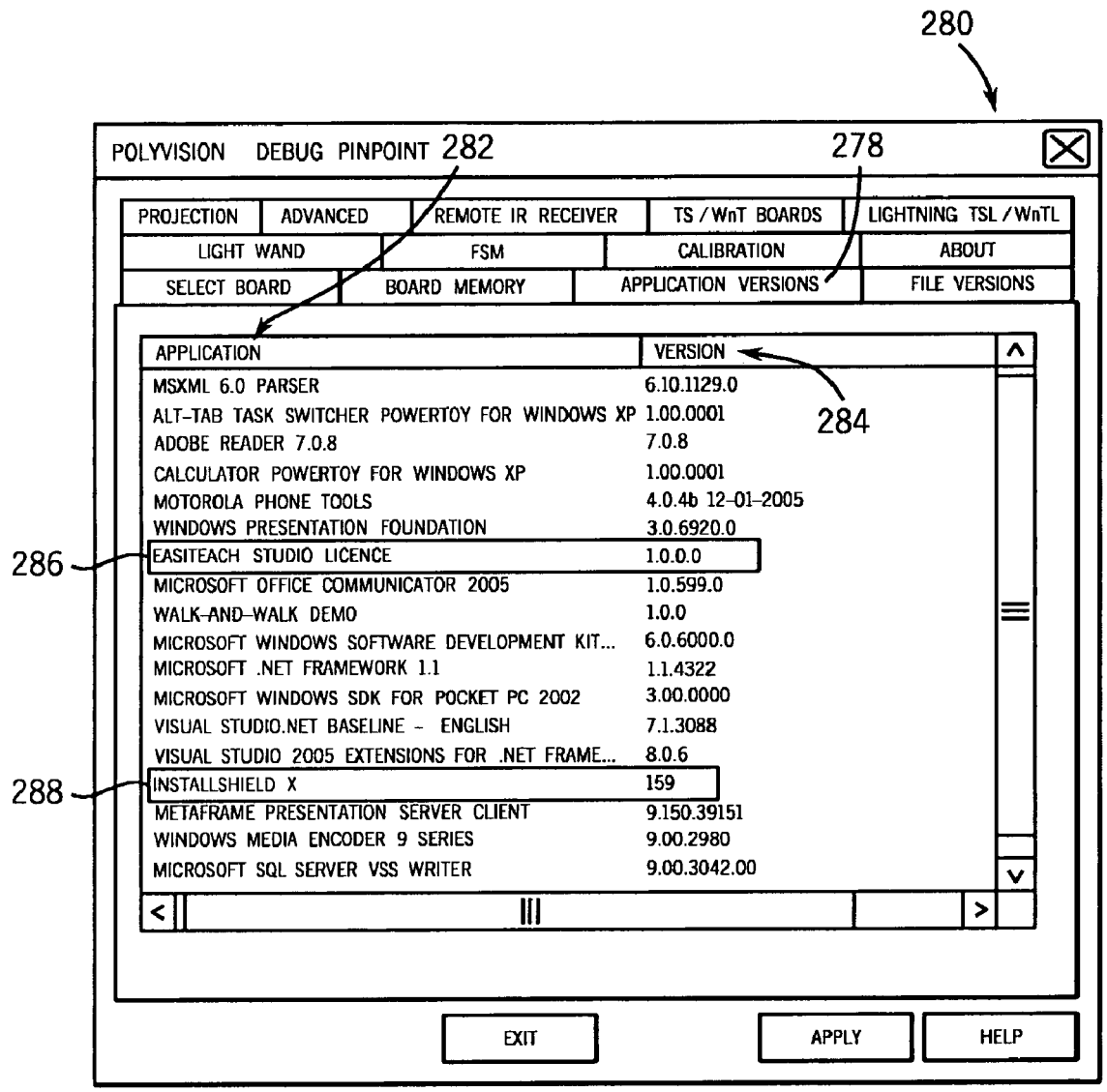
FIG. 21 is an image that lists local computer applications and identifies conflicting applications for a remote technician.

Referring to FIG. 21, an exemplary screen shot 280 shows one way of reporting conflicting application programs when an application versions tab 278 is selected. In FIG. 20 a two column table is provided that includes a list of applications 282 in one column and a list of versions in a second column 284. Version column 284 indicates a version of the application program in column 282. Together the table lists all of the applications and corresponding versions of applications that are loaded onto and run by a local computer (e.g., 20 in FIG. 1) that is linked to remotely. In this example, applications that conflict with whiteboard applications are highlighted. In FIG. 21 highlighted applications are shown with a box there around and include applications 286 and 288.

Figure 22:
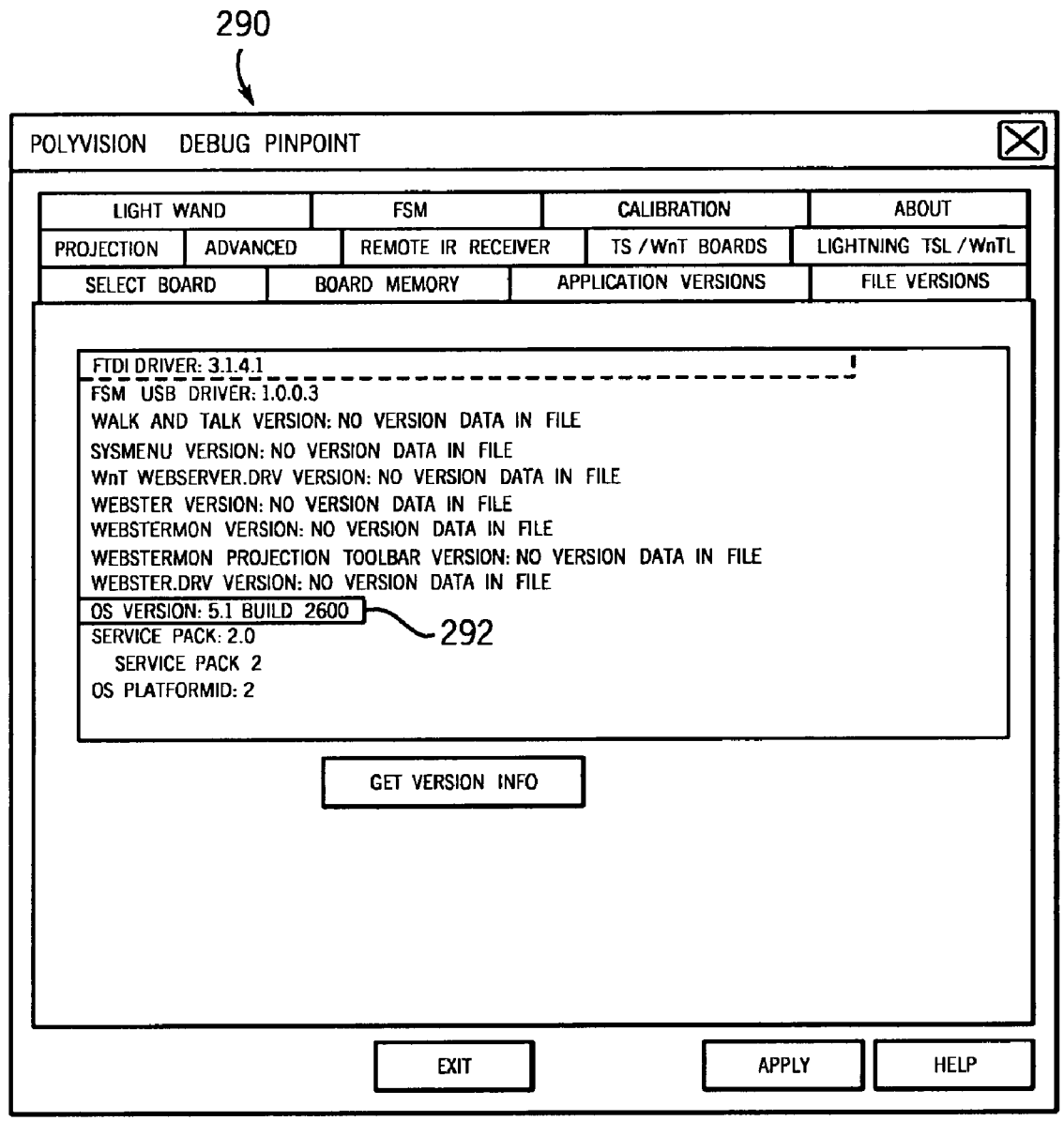
FIG. 22 is an image similar to FIG. 21, albeit showing a list of whiteboard application file versions and indicating a conflicting file.

Referring to FIG. 22, in addition to there being conflicts between application programs that can affect operations of the whiteboard software, there can also be conflicts between whiteboard software files that comprise the whiteboard application programs. To this end, File Versions tab 290 can be selected via the diagnostics software to remotely provide a list of whiteboard software files and associated versions for a technician to view. Here, as in the case of conflicting applications, known conflicts between different file versions can be flagged via highlighting (see box 292 in FIG. 22).

Figure 25:
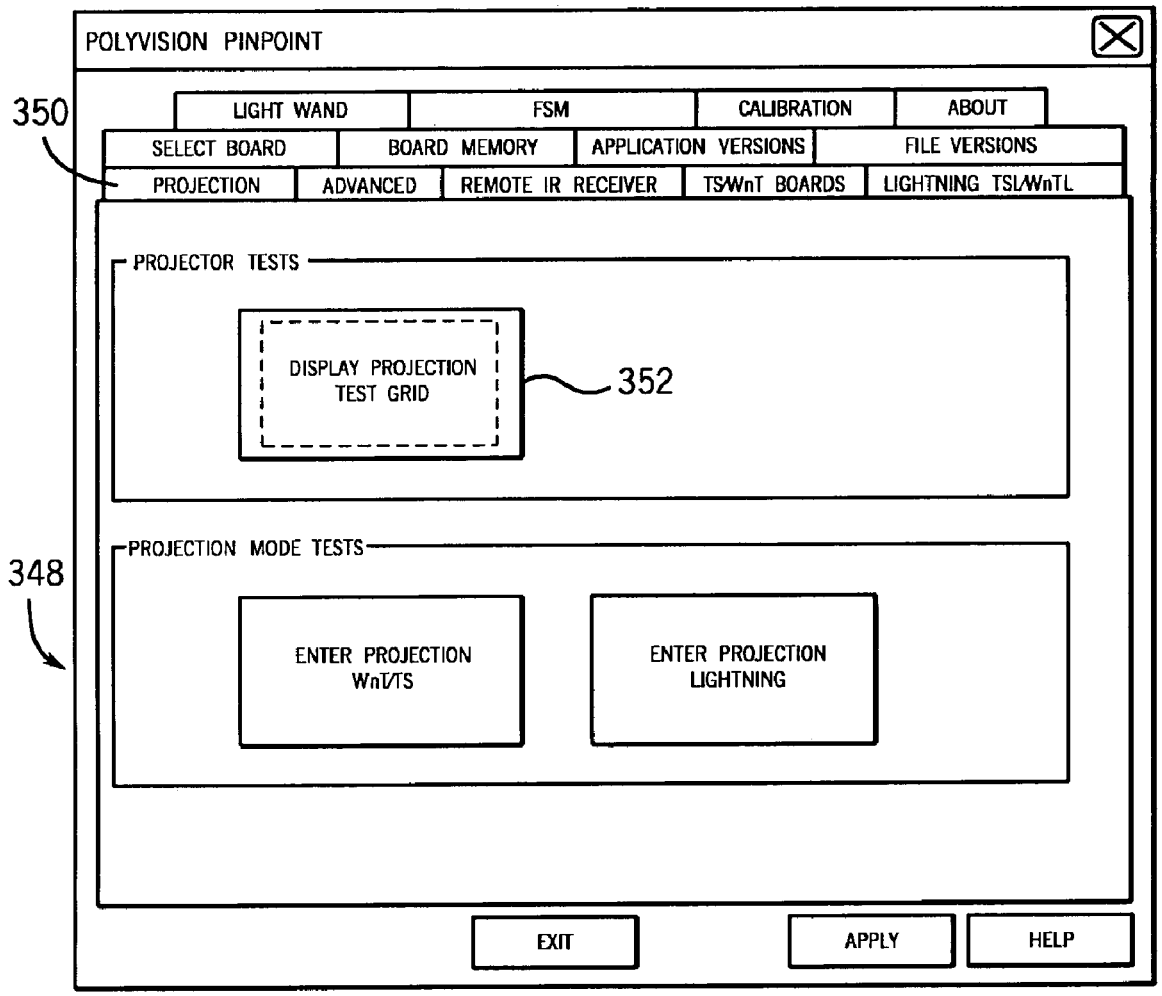
FIG. 25 is an image of diagnostics projection information.

Referring to FIG. 25, a screen shot 348 that can be provided via remote computer 24 is shown that is provided when a projection tab 350 is selected. Here various projection tests can be performed in the case of systems that include a projector like the FIG. 1 system. Here, the projection tests can be used to generate baseline or reference information from which accuracy of other system components can be judged. To this end, as well known in the industry, when a projector projects a rectangular image on a display surface along a trajectory that forms an acute angle with the display surface, the resulting image is not rectangular and instead will include non-parallel lateral edges that converge toward the top edge thereof. Here, the projector can be adjusted to correct for the angle related distortion and produce a rectangular image. Sometimes the corrections cause pixels in the projected image to be removed (i.e., a projected line may be wider at the top of the image than at the bottom). When pixels are removed from an image, the resulting image can be somewhat distorted which can in turn cause irregularities in the way changes via an electronic whiteboard appear in the projected image. Here, where an electronic whiteboard appear to be malfunctioning in at least some cases at least a portion of the perceived error can be related to the image compensation to deal with the projection angle.

Figure 26:
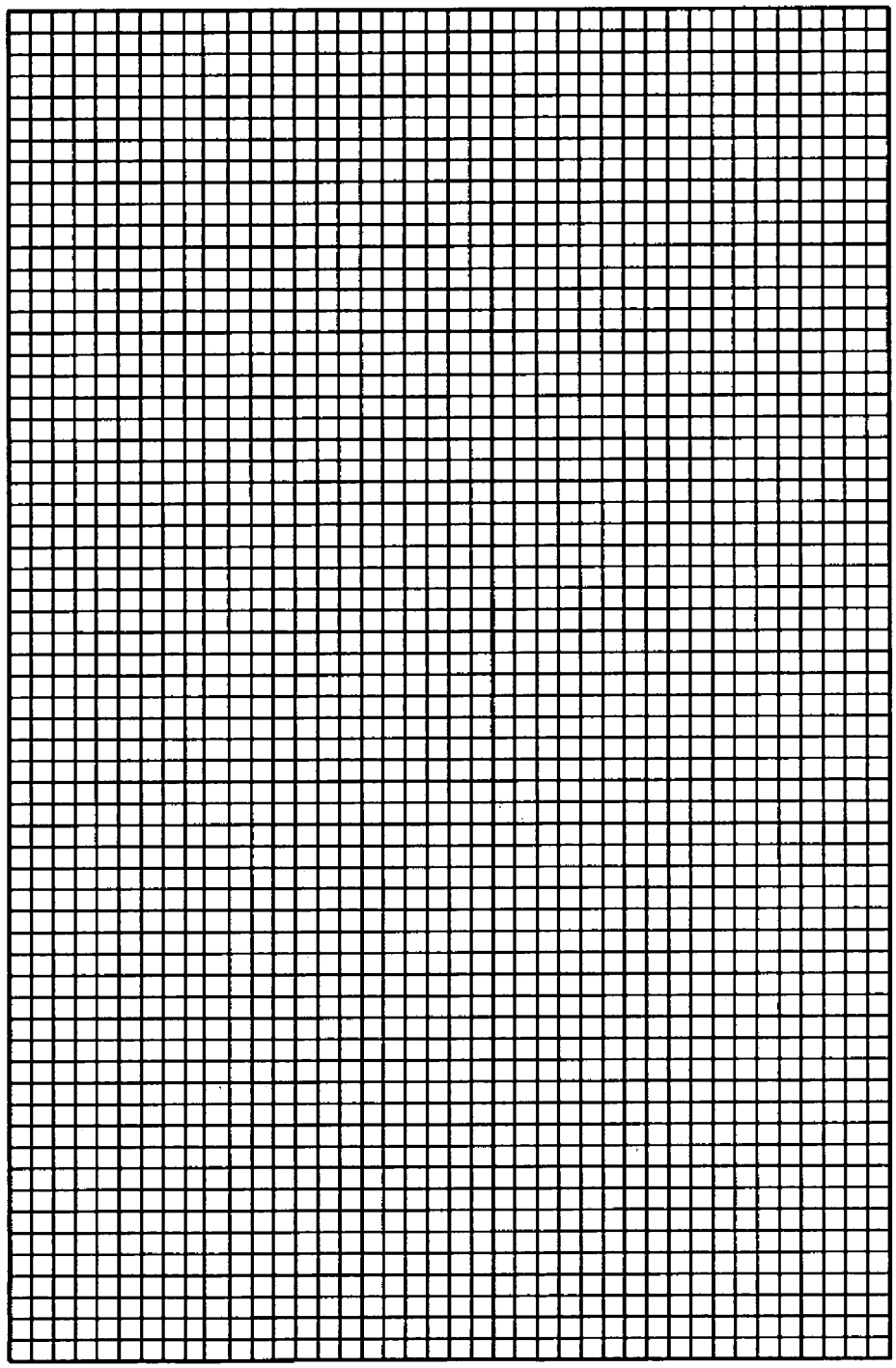
FIG. 26 is a schematic shown a test grid useful in testing accuracy of a projected whiteboard image.

To determine if a perceived error is related to projection angle compensation, icon 352 in FIG. 25 can be selected. When icon 352 is selected, a test grid 360 shown in FIG. 26 may be projected onto surface 18 via projector 12 (see again FIG. 1) where the exemplary grid includes a plurality of vertical and horizontal lines. Here, a local whiteboard user can view the test grid lines and look for any irregularities (e.g., roping where line thicknesses change over the length of lines) where the irregularities indicate board surface locations where tracking errors may be perceived. Once irregularities in the grid are identified, the projected angle compensation may be adjusted in some cases to minimize the irregularities and thereby increase tracking accuracy. In other cases the irregularities are simply noted and are then used as a baseline from which to judge tracking errors.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example, while the diagnostic tests described above are described in the context of a remote diagnostics computer 24, ti should be appreciated that many of the tests and procedures could also be performed using local computer 20 running a version of the diagnostics software. In addition, it is contemplated that several of the diagnostics methods contemplated would be novel irrespective of whether or not they are performed remotely or locally.

What is claimed is:

1. A method for diagnosing causes of a malfunction of an electronic display that includes a display surface, a position sensor for sensing surface activity and generating at least one of X and Y coordinates associated with the surface activity and a local computer that runs board software to convert the at least one of X and Y coordinates into operational commands, the method comprising the steps of:
    linking a remote computer that includes a remote display to the electronic display from a remote location;
    interacting with the display surface to generate X and Y coordinates associated with surface activity;
    transmitting at least one of the X and Y coordinates associated with the surface activity to the remote computer;
    displaying at least a subset of the at least one of X and Y coordinates via the remote display; and
    examining the displayed at least a subset of the at least one of X and Y coordinates via the remote display to ascertain the cause of an electronic display malfunction.

2. The method of claim 1 wherein the step of transmitting at least one of X and Y coordinates includes transmitting both X and Y coordinates associated with surface activity.

3. The method of claim 2 wherein the step of displaying at least a subset includes displaying the X and Y coordinates in a coordinate list.

4. The method of claim 3 wherein the step of interacting with the display surface includes sliding an input tool along the display surface so that the generated X and Y coordinates change over time.

5. The method of claim 3 wherein the X and Y coordinates are presented as coordinate pairs and wherein each X-Y coordinate pair is time stamped.

6. The method of claim 3 further including the step of presenting the X and Y coordinates in a graphical fashion via the remote display.

7. The method of claim 1 wherein the step of interacting with the display surface to generate X and Y coordinates associated with surface activity includes interacting with the display surface in a manner selected to generate expected X and Y coordinates and wherein the step of examining the at least a subset of the at least one of X and Y coordinates via the remote display to ascertain the cause of a display malfunction includes examining the at least a subset of the at least one of X and Y coordinates to identify a deviation from the expected X and Y coordinates.

8. The method of claim 1 wherein the step of examining includes visually observing the displayed coordinates.

9. A method for diagnosing causes of an electronic display malfunction where the display includes a display surface, a position sensor for sensing surface activity and generating X and Y coordinates associated with the surface activity and a local computer that runs board software to convert the X and Y coordinates into graphical segments and that electronically stores the graphical segments, the method comprising the steps of:
   linking a remote computer that includes a remote display and that is remotely located to an electronic display;
   moving an input device around on the display surface to generate X and Y coordinates associated with surface activity;
   converting the X and Y coordinates into graphical segments;
   storing the graphical segments;
   transmitting the X and Y coordinates associated with the surface activity to the remote computer;
   textually displaying the X and Y coordinates via the remote display; and
   examining the displayed X and Y coordinates to ascertain the cause of a electronic display malfunction.

10. The method of claim 9 wherein the step of moving an input device around includes sliding an input tool along the display surface so that the generated X and Y coordinates change over time.

11. An apparatus for diagnosing causes of an electronic display malfunction wherein the display includes a display surface, a position sensor for sensing surface activity and generating at least one of X and Y coordinates associated with the surface activity and a local computer that runs board software to convert the at least one of X and Y coordinates into operational commands, the apparatus comprising:
   a remote computer that includes a display and a processor where the processor is linked to the electronic display, the processor programmed to:
   (a) when a user interacts with the display surface by sliding an input tool along the display surface so that the generated X and Y coordinates change over time and the sensor generates raw X and Y coordinates associated with surface activity, receive at least one of the X and Y coordinates associated with the surface activity; and
   (b) textually display at least a subset of the at least one of X and Y coordinates via the display, wherein the displayed coordinates can be examined to ascertain the cause of a board malfunction.

12. The apparatus of claim 11 wherein the processor receives both X and Y coordinates associated with surface activity.

13. The apparatus of claim 12 wherein the processor displays the X and Y coordinates in a coordinate list.

14. The apparatus of claim 13 wherein the X and Y coordinates are presented as coordinate pairs and wherein each X-Y coordinate pair is time stamped.

15. The apparatus of claim 13 wherein the processor is further programmed to present the X and Y coordinates in a graphical fashion via the remote display.

16. A method for diagnosing causes of a malfunction of an electronic display, the method comprising the steps of:
   linking a remote computer to the electronic display from a remote location wherein the remote computer is used by a technician;
   providing control commands via the remote computer intended to control at least certain features of the display;
   transmitting the control commands to the display to control display operation;
   using the control commands to control operation of the display without human intervention;
   locally determining the operating status of the display;
   providing feedback to the technician regarding the display status; and
   analyzing the feedback to ascertain the cause of a display malfunction.

17. The method of claim 16 wherein the display includes a display subset of components wherein each component in the display subset is activated upon the occurrence of an operating condition associated with the display, the step of providing control commands including providing an activation command via the remote computer intended to activate at least a first of the display subset components independent of the operating condition of the display and wherein the step of locally determining includes locally determining when the first component is activated.

18. The method of claim 17 wherein the first component is an illumination device on the display.

19. The method of claim 18 wherein the display includes a plurality of illumination devices and wherein the process is repeated for each illumination device in the plurality.

20. The method of claim 17 wherein the first component is a display fan for cooling other components.

21. The method of claim 17 wherein the first component is a sound generating component.

22. A method for diagnosing causes of a malfunction of an electronic display that includes a display surface, a position sensor for sensing surface activity and generating at least one of X and Y coordinates associated with the surface activity and a local computer that runs board software to convert the at least one of X and Y coordinates into operational commands, the method comprising the steps of:
   linking a remote computer that includes a remote display to the electronic display from a remote location;
   interacting with the display surface to generate X and Y coordinates associated with surface activity;
   transmitting at least one of the X and Y coordinates associated with the surface activity to the remote computer;
   graphically displaying one of X and Y coordinates via the remote display; and
   examining the graphically displayed one of X and Y coordinates via the remote display to ascertain the cause of an electronic display malfunction.

23. The method of claim 22 wherein the step of interacting with the display surface includes sliding an input tool along the display surface so that the generated X and Y coordinates change over time.

24. A method for diagnosing causes of a malfunction of an electronic display that includes a display surface, a position sensor for sensing surface activity and generating at least one of X and Y coordinates associated with the surface activity and a local computer that runs board software to convert the at least one of X and Y coordinates into operational commands, the method comprising the steps of:

linking a remote computer that includes a remote display to the electronic display from a remote location;

interacting with the display surface in a manner selected to generate at least one of expected X and Y coordinates;

transmitting at least one of the X and Y coordinates associated with the surface activity to the remote computer;

presenting a representation of at least a subset of the at least one of X and Y coordinates via a remote display associated with the remote computer; and examining the representation of at least a subset of the at least one of X and Y coordinates to identify a deviation from the expected X and Y coordinates;

ascertaining the cause of a display malfunction based at least in part on the identified deviation.

25. The method of claim 24 wherein the step of interacting with the display surface includes selecting a point on the display surface.

26. The method of claim 24 wherein the step of interacting with the display surface includes moving an input device on the surface so that the generated coordinates associated therewith change over time.

27. The method of claim 24 wherein the step of presenting a representation includes presenting the X and Y coordinates textually on the remote display.

* * * * *

UNITED STATES PATENT AND TRADEMARK OFFICE
CERTIFICATE OF CORRECTION

PATENT NO. : 8,355,892 B2
APPLICATION NO. : 12/303299
DATED : January 15, 2013
INVENTOR(S) : Brand C. Kvavle et al.

Page 1 of 1

It is certified that error appears in the above-identified patent and that said Letters Patent is hereby corrected as shown below:

In the Claims:

Column 18, Claim 20, line 38, "other components" should be --other whiteboard components--.

Signed and Sealed this
Fourteenth Day of May, 2013

Teresa Stanek Rea
*Acting Director of the United States Patent and Trademark Office*